(12) United States Patent
Asgekar et al.

(10) Patent No.: US 11,907,648 B2
(45) Date of Patent: Feb. 20, 2024

(54) AUTOGRADER FRIENDLY PRINTABLE WORKSHEETS

(71) Applicant: Pencil Learning Technologies, Inc., Palo Alto, CA (US)

(72) Inventors: Amogh Asgekar, Palo Alto, CA (US); Ayush Agarwal, San Francisco, CA (US)

(73) Assignee: Pencil Learning Technologies, Inc., Palo Alto, CA (US)

( * ) Notice: Subject to any disclaimer, the term of this patent is extended or adjusted under 35 U.S.C. 154(b) by 0 days.

(21) Appl. No.: 17/984,137

(22) Filed: Nov. 9, 2022

(65) Prior Publication Data

US 2023/0148424 A1 May 11, 2023

Related U.S. Application Data

(60) Provisional application No. 63/278,074, filed on Nov. 10, 2021.

(51) Int. Cl.
*G06F 40/166* (2020.01)
*G06K 1/12* (2006.01)

(52) U.S. Cl.
CPC .......... *G06F 40/166* (2020.01); *G06K 1/121* (2013.01)

(58) Field of Classification Search
CPC ....................................... G06F 40/166
See application file for complete search history.

(56) References Cited

U.S. PATENT DOCUMENTS

2023/0199064 A1* 6/2023 Sun et al. ........... H04L 67/1074

* cited by examiner

*Primary Examiner* — James J Debrow
(74) *Attorney, Agent, or Firm* — Volpe Koenig P.C.

(57) ABSTRACT

The present disclosure provides systems and methods for encoding and decoding a machine-readable document. A system can include a computing device comprising a processor and a memory. To encode each entry on a document, the processor can receive an identification of an entry, identify an entry format, and generate an entry fingerprint. The processor can calculate a hash value from the identification, the entry format, and the entry fingerprint, which can then be stored at an address corresponding to the hash value. The processor can generate an optical code, and print the entry and the optical code on the document. To decode the document, the processor can extract the hash value, a first entry identifier, and a user identifier from the optical code. The processor can retrieve a second entry identifier and determine a match with the first entry identifier. The processor can retrieve entry coordinates and extract the entry.

20 Claims, 8 Drawing Sheets

AUTOGRADER FRIENDLY PRINTABLE WORKSHEETS

RELATED APPLICATIONS

This application claims the benefit of and priority to U.S. Provisional Patent Application No. 63/278,074, entitled "Autograder Friendly Printable Worksheets," filed Nov. 10, 2021, the entirety of which is incorporated by reference herein.

BACKGROUND

Educators can assign worksheets (e.g., homework, documents, or assignments) with questions for students to answer. The formats and layouts of the worksheets can be designed by an institution or an educator. The questions can include at least multiple choices, short-answer, open-ended, or fill-in-the-blank questions. The students can print or receive the assigned worksheet to physically fill out the answers. However, when receiving the worksheets from the students, educators have to manually review, correct, or grade the worksheets from the students.

SUMMARY

Conventionally, educators can manually grade physical assignments from students of an institution. Grading these physical assignments can be one of the most time-consuming activities for educators. Furthermore, conventional technologies, such as scantron, have been developed and deployed to automate the process of analyzing multiple-choice question sets. However, conventional automated optical analysis technologies for grading assignments rely on a predictable format for answers, specific response formats (e.g., carefully filled in "bubbles"), and limited input options (e.g., blue or black ink, or a #2 pencil). Using scantron as an example, students are expected to use specific input options to completely fill in "bubbles" within specialized sheets configured to be scanned using a scantron machine. Due to the specific inputs and formats required, answers outside the formats (e.g., "bubbles" not completely filled, erased, or marking at least a portion of multiple "bubbles") or the input options (e.g., red ink or #4 pencil) may not be registered or marked accurately by conventional technologies, such as the scantron machine/scanner.

Further from the above example, scantrons may not be printed using standard printing paper (e.g., a letter, legal, or A4 printing paper), but instead with specialized sheets. Due to specialized sheets required for scantrons, institutions may consume more resources to produce, prepare, and provide assignments to students. Students may be limited to a single scantron sheet and can obtain a replacement sheet only from an educator, consuming resources for both parties. Additionally, if scantron scanners are not available within the institution, scantrons may be sent to other institutions or facilities for scanning, grading, or analysis, thereby further consuming resources to grade the assignments.

The systems and methods of this technical solution can provide printed worksheets that enable educators to create a page design with custom layout, intermingle multiple-choice and open-ended questions, reliably auto-grade multiple choice questions with various inputs options, and transmit the worksheets to a separate workflow for artificial intelligence ("AI") assisted grading (e.g., for open-ended questions). The systems and methods can include a computing device to perform features and functionalities discussed herein. The computing device can enable auto-grading without involving any special equipment, such as a scantron machine or other special scanner. The computing device can allow for more flexible formats in the worksheets that can be captured with commodity image capturing devices (e.g., cellphone or laptop cameras) and processed to automatically grade the answers. The computing device can allow any input options to be captured for automatically grading the answers.

Having no restrictions on worksheet formats, layouts, or input options, the systems and methods of this technical solution can automatically grade worksheets through optical analysis without a predetermined page structure. The worksheets may be referred to generally as documents (e.g., machine-readable documents), assignments, or files. The worksheet can be an optically readable sheet, which can include a sheet of material having an identifier region. The identifier region can include at least one sheet identifier. The sheet identifier can be associated with the entire sheet and/or each question within the sheet. The sheet identifier in the identifier region can be unique to each sheet. The sheet identifier can include a user identifier, such as an individual that printed the sheet. In some cases, the sheet identifier may not include the identity of an individual person. For example, an educator can print worksheets for a body of students, where each sheet can include a randomized arrangement of question sequences. The sheet can include various answer regions (e.g., multiple-choice regions and/or open-ended regions), where multiple-choice regions can include multiple choices (e.g., mark, "bubble", box, etc.) for marking selection, and the open-ended regions can include open space for writing answers (e.g., characters, numbers, equations, notes, etc.). The marks can be at a predetermined position within the sheet or dynamically adjusted based on the position of the question. For example, based on the preceding question, the marks of a subsequent question can be placed higher or lower on a sheet due to the size of an answering area, the number of multiple choices provided, or the layout of the choices. Entries in the sheet (e.g., questions or marks) can be in a predetermined orientation, size, or scale. The sheet identifier can be in a predetermined location on the sheet, which can be configured by the institution or educators. The entry identifiers can be in various locations on the sheet based on the position of their associated questions. The computing device can optically read the sheet identifier or the entry identifiers. The computing device can identify or determine the locations to print each identifier. The computing device can read or extract each identifier from any position on the sheet.

The systems and methods can perform perspective correction of the worksheets. Perspective correction can include, but not limited to, cropping a portion of an image frame, translation or rotation of the image, and warp correction. The computing device can crop a portion of the image to extract a worksheet page from the entire image frame (e.g., filter background or other items surrounding the document). The computing device can translate or rotate the image to correct for 3-dimensional ("3D") rotation of the worksheet relative to the plane, positioning, or angle of the camera used to capture the image. By translating or rotating the image, the computing device can ensure all corners of the transformed image are equidistant from the center of the image. The computing device can perform warp correction to refine or rectify any crease, folding, rolling, or other uneven surfaces of the document.

The systems and methods can encode question context in the rendered question. The computing device can retrieve, identify, generate, or determine an entry identifier (e.g., question identifier), a user identifier (e.g., identification of the user generating the worksheet), an entry fingerprint, and an entry format. The computing device can calculate a hash value to store a hash of the entry identifier, the user identifier, the entry fingerprint, and the entry format. The computing device can sign the hash with a secret key. The computing device can generate an optical code (e.g., QR code, Data Matrix code, Aztec, among other barcodes) and print the optical code along with the associated entry on the document.

The systems and methods can decode the question context from the optical code presented in the document. The computing device can receive and perform perspective correction on an image of the document. The computing device can extract a hash value, a first entry identifier, and a first user identifier from one or more optical codes in the document. Using the hash value, the computing device can retrieve a second entry identifier and a second user identifier from an address in a database corresponding to the hash value. Based on a match between at least the first entry identifier and the second entry identifier, or between the first user identifier and the second user identifier, the computing device can retrieve entry coordinates to extract the answer from the worksheet. Thus, by performing perspective correction and encoding/decoding the machine-readable document, the systems and methods described herein can automate grading assignments in any format, layouts, and input options. The systems and methods described herein can thereby reduce resource consumption (e.g., from utilizing specialized sheets or equipment for automated grading), improve accuracy or reduce erroneous in grading answers (e.g., using incompatible input options or slight format blunder), and increase efficiency in grading worksheets by enabling remote uploads and gradings of assignment using commodity image capturing devices rather than manually using scanning machines to grade the assignments.

At least one aspect of the present disclosure is directed to a method for encoding a machine-readable document. The method can be performed, for example, by a computing device comprising one or more processors and memory storing a database. For each of one or more entries to be encoded on the machine-readable document, the method can include receiving, by a computing device, an identification of an entry. The method can include identifying, by the computing device from the identification of the entry, an entry format. The method can include generating, by the computing device, an entry fingerprint. The method can include calculating, by the computing device, a hash value from a hash of at least the identification of the entry, the entry format, and the entry fingerprint. The method can include storing, by the computing device in a database at an address corresponding to the hash value, the identification of the entry, the entry format, and the entry fingerprint. The method can include generating, by the computing device, an optical code from the hash value. The method can include. The method can include printing, by the computing device on the machine-readable document, the entry and the optical code.

To receive the identification of the entry, the method can include receiving, by the computing device, an entry identifier and a user identifier. To generate the entry fingerprint, the method can include combining, by the computing device, a printing timestamp for the entry, a user identifier, and a device identifier. To generate the entry fingerprint, the method can include calculating, by the computing device, a hash of the printing timestamp for the entry, the user identifier, and the device identifier. The optical code can be printed in proximity to the entry. The user identifier can be associated with a user requesting printing of the machine-readable document. The entry format can identify coordinates of an entry field. The entry format can comprise a randomization seed value.

At least one other aspect of the present disclosure is directed to a system for encoding a machine-readable document. The system can include a computing device comprising a memory storing a database and a processor. For each of one or more entries to be encoded on the machine-readable document, the processor can receive an identification of an entry. The processor can identify, from the identification of the entry, an entry format. The processor can calculate a hash value from a hash of at least the identification of the entry, the entry format, and the entry fingerprint. The processor can store, in the database at an address corresponding to the hash value, the identification of the entry, the entry format, and the entry fingerprint. The processor can generate an optical code from the hash value. The processor can print, on the machine-readable document, the entry and the optical code.

For each of the one or more entries, the processor can receive an entry identifier and a user identifier. For each of the one or more entries, the processor can combine a printing timestamp for the entry, a user identifier, and a device identifier to generate the entry fingerprint. For each of the one or more entries, the processor can calculate a hash of the printing timestamp for the entry, the user identifier, and the device identifier. The optical code can be printed in proximity to the entry. The user identifier can be associated with a user requesting printing of the machine-readable document. The entry format can identify coordinates of an entry field. The entry format can comprise a randomization seed value.

At least one other aspect of the present disclosure is directed to a method for decoding a machine-readable document. The method can include a computing device comprising one or more processors and memory storing a database. The method can include receiving, by a computing device, an image of the machine-readable document comprising at least one entry and a corresponding at least one optical code encoding a hash value, a first entry identifier, and a user identifier. For each of the at least one entries, the method can include extracting, by the computing device from the corresponding optical code, the hash value. The method can include retrieving, by the computing device from a database at an address corresponding to the hash value, a second entry identifier. The method can include determining, by the computing device, that the first entry identifier and the second entry identifier match. Responsive to the determination, the method can include retrieving, by the computing device from the database at the address corresponding to the hash value, entry coordinates. The method can include extracting, by the computing device from the image at the entry coordinates, an entry.

Each corresponding at least one optical code can encode a first user identifier. For each of the at least one entry, the method can include retrieving, by the computing device from the database at the address corresponding to the hash value, a second user identifier. The method can include determining, by the computing device, that the first user identifier and second user identifier match. Retrieving the entry coordinates can be performed further responsive to the determination that the first user identifier and second user identifier match. The entry coordinates of a first entry can identify coordinates of a plurality of user-fillable elements.

To extract the first entry, the method can include identifying, by the computing device, a first filled-in user-fillable element of the plurality of user-fillable elements. The entry coordinates of a first entry can identify boundaries of a user-entry region. To extract the first entry, the method can include performing, by the computing device, optical character recognition on the image of the machine-readable document within the identified boundaries.

At least one other aspect of the present disclosure is directed to a system for decoding a machine-readable document. The system can include a computing device comprising a memory storing a database and a processor. The processor can receive an image of the machine-readable document comprising at least one entry and a corresponding at least one optical code encoding a hash value, a first entry identifier, and a user identifier. For each of the at least one entries, the processor can extract, from the corresponding optical code, the hash value. The processor can retrieve, from a database at an address corresponding to the hash value, a second entry identifier. The processor can determine that the first entry identifier and the second entry identifier match. Responsive to the determination, the processor can retrieve, from the database at the address corresponding to the hash value, entry coordinates. The processor can extract, from the image at the entry coordinates, an entry.

Each corresponding at least one optical code can encode a first user identifier. For each of the at least one entries, the processor can retrieve, from the database at the address corresponding to the hash value, a second user identifier. The processor can determine that the first user identifier and second user identifier match. Retrieving the entry coordinates can be performed further responsive to the determination that the first user identifier and second user identifier match. The entry coordinates of a first entry can identify coordinates of a plurality of user-fillable elements. To extract the first entry, the processor can identify a first filled-in user-fillable element of the plurality of user-fillable elements. The entry coordinates of a first entry can identify boundaries of a user-entry region. To extract the first entry, the processor can perform optical character recognition on the image of the machine-readable document within the identified boundaries.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, techniques, approaches, methods, apparatuses, and systems for managed video conferencing. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein; and Section B describes systems and methods for automatically grading worksheets.

A. Computing and Network Environment

Figure 1A:
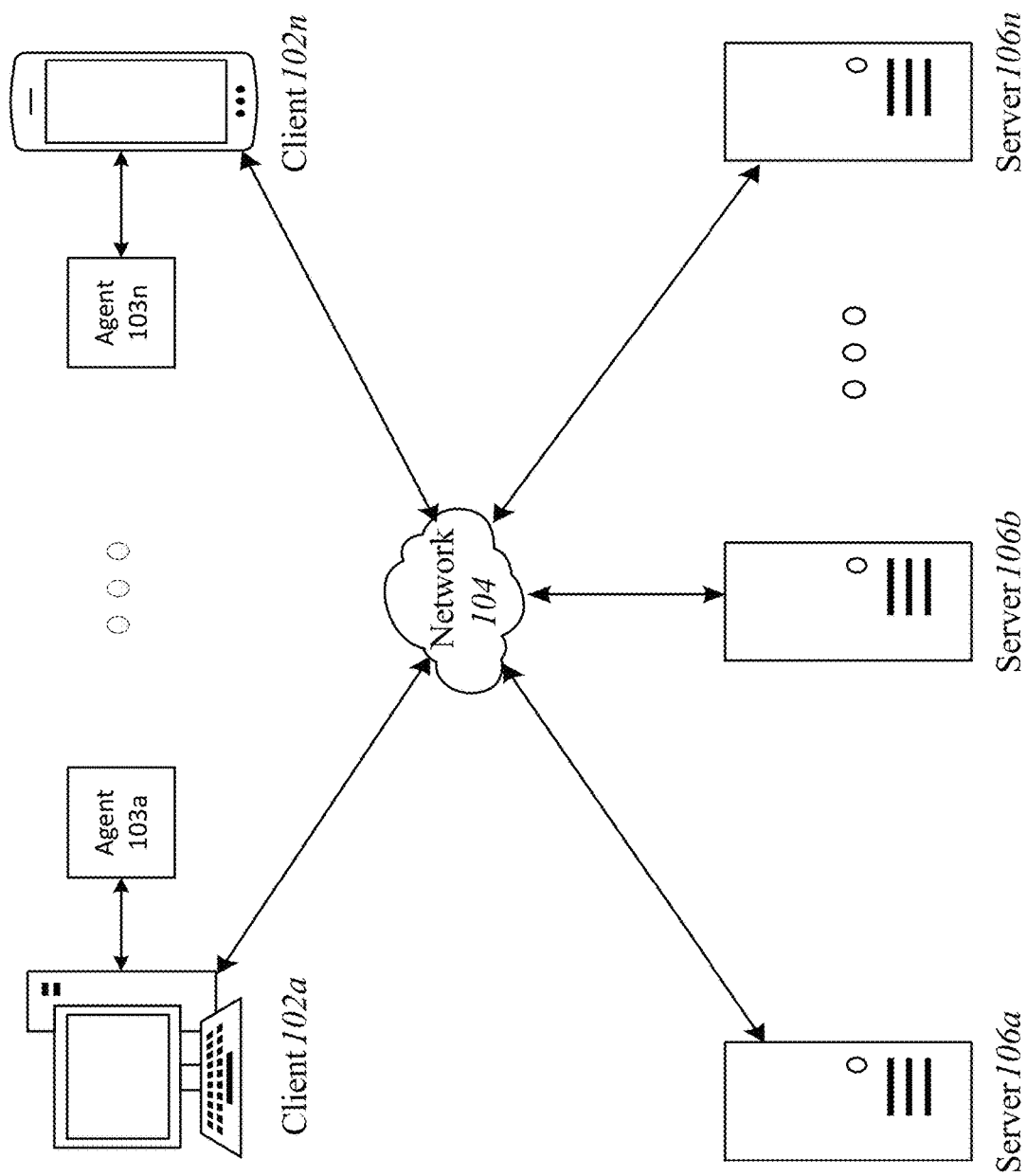
FIG. 1A is a block diagram depicting an embodiment of a network environment comprising a client device in communication with a server device.

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generations of mobile telecommunication standards by fulfilling a specification or standards such as the specifications maintained by the International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, server 106 may be referred to as a remote machine or a node. In another embodiment, a plurality of nodes 290 may be in the path between any two communicating servers.

Figure 1B:
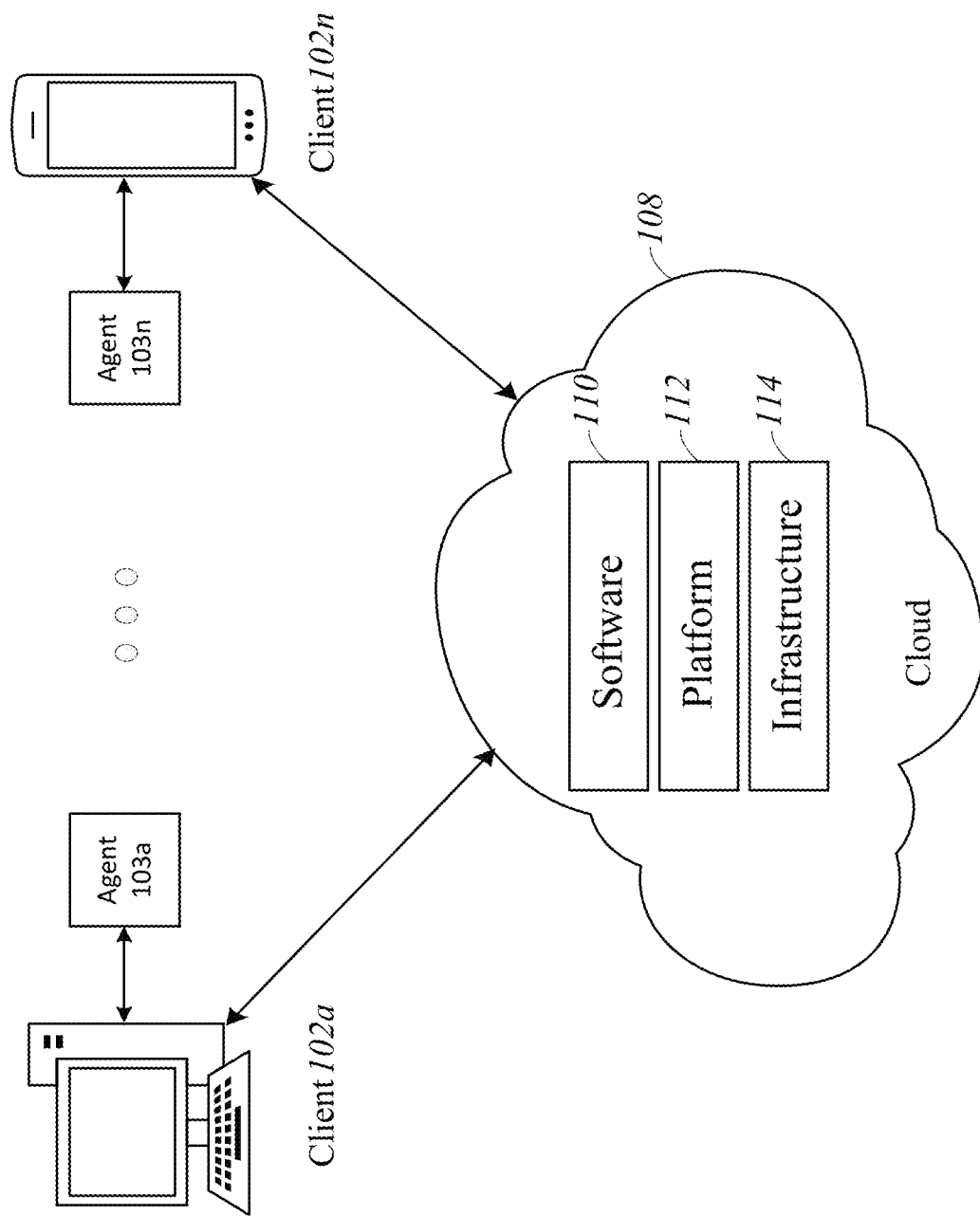
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
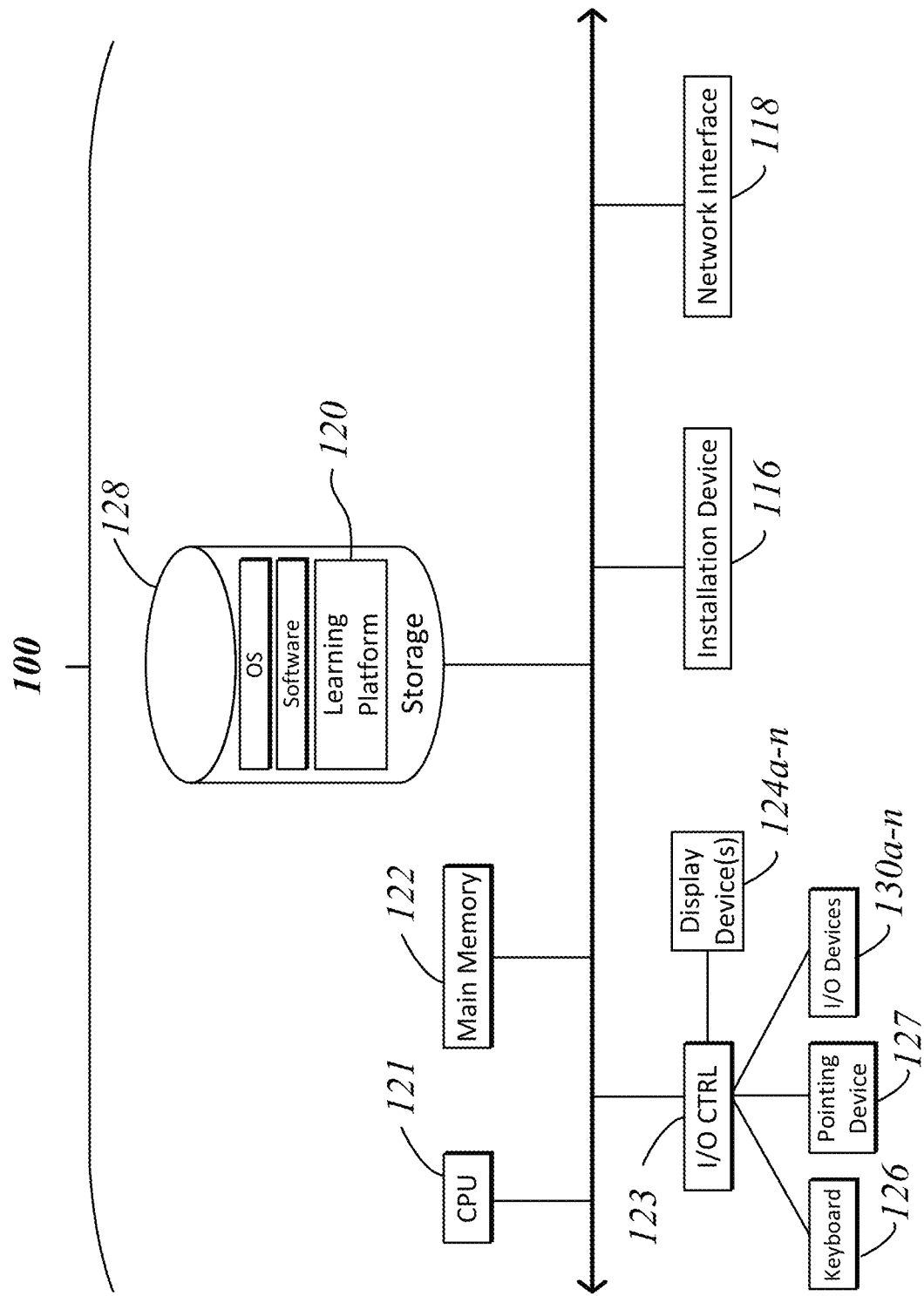
FIGS. 1C and 1D are block diagrams depicting embodiments of computing devices useful in connection with the methods and systems described herein.
Figure 1D:
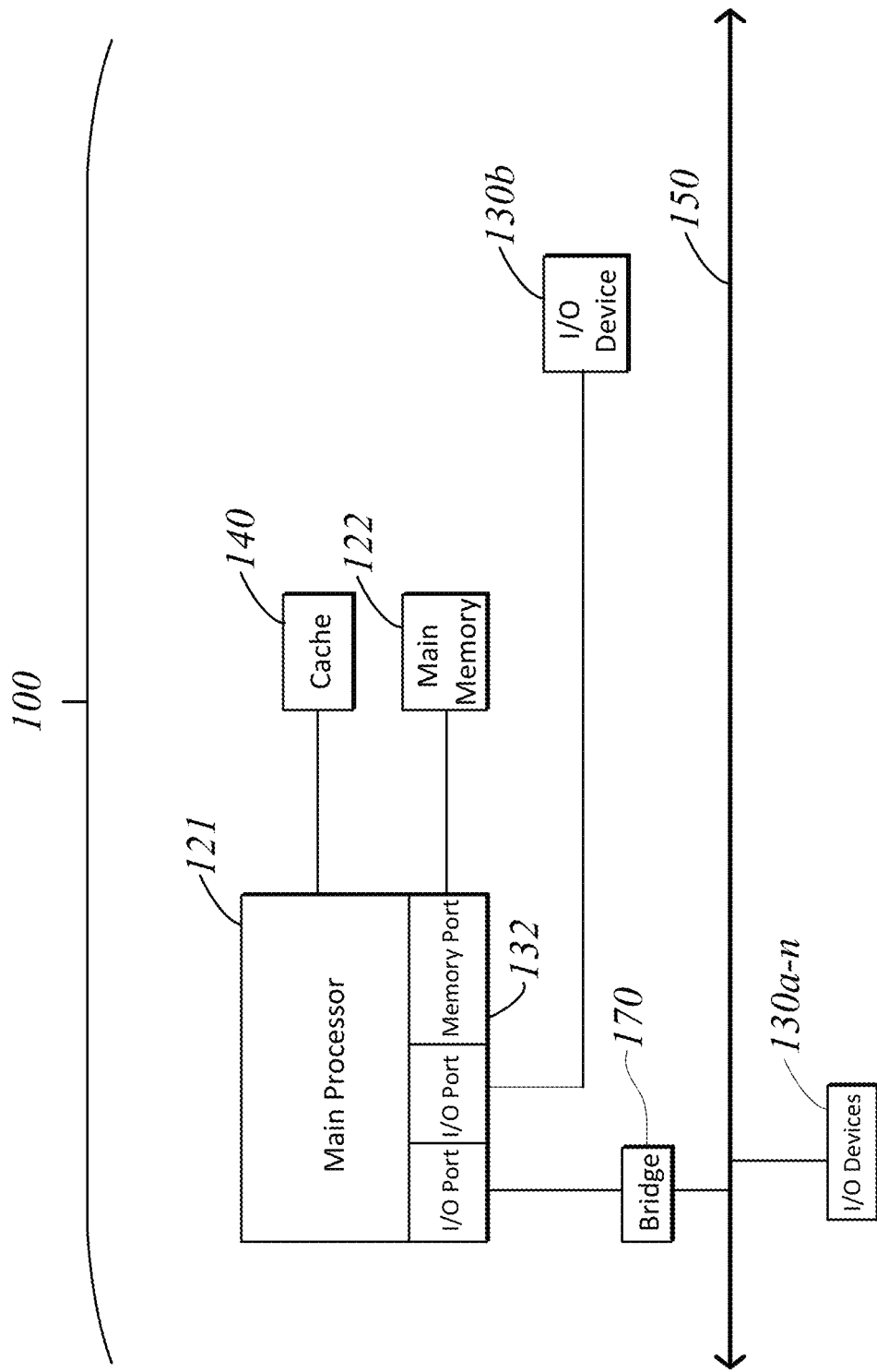

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and learning platform 120, which can implement any of the features of the educational content system 205 described herein below in conjunction with FIG. 2. As shown in FIG. 1D, each computing device 100 may also include additional optional elements, e.g. a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provide for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g. one or more hard disk drives or redundant arrays of independent disks) for storing an operating system or other related software, and for storing application software programs such as any program related to the learning platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage devices 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or applications from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102*a*-102*n* may access over a network 104. An application distribution platform may include applications developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2062, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, XBOX ONE X, XBOX SERIES S, or an XBOX SERIES X device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington In other embodiments, the computing device 100 is an eBook reader, e.g. the KINDLE family of devices by Amazon.com, or the NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Automatically Grading Worksheets

Conventionally, educators can manually grade physical assignments from students of an institution. Grading these physical assignments can be one of the most time-consuming activities for educators. Furthermore, conventional technologies, such as scantron, have been developed and deployed to automate the process of analyzing multiple-choice question sets. However, conventional automated optical analysis technologies for grading assignments rely on a predictable format for answers, specific response formats (e.g., carefully filled in "bubbles"), and limited input options (e.g., blue or black ink, or a #2 pencil). Using scantron as an example, students are expected to use specific input options to completely fill in "bubbles" within specialized sheets configured to be scanned using a scantron machine. Due to the specific inputs and formats required, answers outside the formats (e.g., "bubbles" not completely filled, erased, or marking at least a portion of multiple "bubbles") or the input options (e.g., red ink or #4 pencil) may not be registered or marked accurately by conventional technologies, such as the scantron machine/scanner.

Further from the above example, scantrons may not be printed using standard printing paper (e.g., a letter, legal, or A4 printing paper), but instead with specialized sheets. Due to specialized sheets required for scantrons, institutions may consume more resources to produce, prepare, and provide assignments to students. Students may be limited to a single scantron sheet and can obtain a replacement sheet only from an educator, consuming resources for both parties. Additionally, if scantron scanners are not available within the institution, scantrons may be sent to other institutions or facilities for scanning, grading, or analysis, thereby further consuming resources to grade the assignments.

The systems and methods of this technical solution can provide printed worksheets that enable educators to create a page design with custom layout, intermingle multiple-choice and open-ended questions, reliably auto-grade multiple choice questions with various inputs options, and transmit the worksheets to a separate workflow for artificial intelligence ("AI") assisted grading (e.g., for open-ended questions). The systems and methods can include a computing device to perform features and functionalities discussed herein. The computing device can enable auto-grading without involving any special equipment, such as a scantron machine or other special scanner for uploading worksheets for processing or grading. The computing device can allow for more flexible formats in the worksheets that can be captured with commodity image capturing devices (e.g., cellphone or laptop cameras) and processed to automatically grade the answers. The computing device can allow any input options (e.g., any colored ink, pencil number, opacity, or thickness) to be captured for automatically grading the answers. In some cases, the term "question" can be referred to as inquiry and the term "answer" can be referred to as a response to the inquiry.

Having no restrictions on worksheet formats, layouts, or input options, the systems and methods of this technical solution can automatically grade worksheets through optical analysis without a predetermined page structure. The worksheets may be referred to generally as documents (e.g., machine-readable documents), assignments, or files. The worksheet can be of any size suitable for printing using any printing device or preferred by individuals printing or answering questions on the worksheet. The worksheet can be an optically readable sheet, which can include a sheet of material having an identifier region. The identifier region can include at least one sheet identifier. The sheet identifier can be associated with the entire sheet and/or each question within the sheet. The sheet identifier in the identifier region can be unique to each sheet. The sheet identifier can include a user identifier, such as an individual that printed the sheet. In some cases, the sheet identifier may not include the identity of an individual person. For example, an educator can print worksheets for a body of students, where each sheet can include a randomized arrangement of question sequences. The sheet can include various answer regions (e.g., multiple-choice regions and/or open-ended regions), where multiple-choice regions can include multiple choices (e.g., mark, "bubble", box, etc.) for marking selection, and the open-ended regions can include open space for writing answers (e.g., characters, numbers, equations, notes, etc.). The marks can be at a predetermined position within the sheet or dynamically adjusted based on the position of the question. For example, based on the preceding question, the marks of a subsequent question can be placed higher or lower on a sheet due to the size of an answering area, the number of multiple choices provided, or the layout of the choices. Entries in the sheet (e.g., questions or marks) can be in a predetermined orientation, size, or scale. The sheet identifier can be in a predetermined location on the sheet, which can be configured by the institution or educators. The entry identifiers can be in various locations on the sheet based on the position of their associated questions. The computing device can optically read the sheet identifier or the entry identifiers. The computing device can identify or determine the locations to print each identifier. The computing device can read or extract each identifier from any position on the sheet.

The computing device can perform perspective correction of the worksheets. Perspective correction can include, but not limited to, cropping a portion of an image frame, translation or rotation of the image, and warp correction. The computing device can crop a portion of the image to extract a worksheet page from the entire image frame (e.g., filter background or other items surrounding the document). Additional image data around the worksheet can be captured, such as near the edges, corners, or perimeter of the worksheet. For example, the computing device can place representational markers (e.g., predetermined shapes or icons) along the borders of the worksheet. The representational markers can include, for example, a right-angled bracket shape in various orientations at each edge of the worksheet, or a rectangle, a parallelogram, or a trapezoid around the worksheet to indicate its boundaries. The computing device can use the representational markers in assisting with cropping at least one worksheet page from the entire image frame.

The computing device can select predetermined shapes such that the size relative to the orientation of the representation markers can represent a 3D perspective of the sheet. In some cases, the computing device can determine or select one or more shapes based on the outline, edges, among other indications representing the surface of the sheet. The computing device can detect depth within the image to generate a 3D representation of the image. The 3D representation can include values (e.g., bits or numerical values), indicating the colors and positions of each portion of the paper within the 3D matrix. For example, a larger bracket shape can represent a closer edge of the sheet to the camera and a smaller bracket shape can represent a farther edge of the sheet to the camera. The computing device can select or choose the shapes to allow extraction of a 3D rotation transformation matrix. Based on the inverse of the 3D rotation transformation matrix, the computing device can translate or rotate the image to correct for 3D translation or rotation of the worksheet relative to the plane, positioning, or angle of the camera used to capture the image. For example, an initial 3D rotation transformation matrix (e.g., a first matrix) can include values representing the initial orientation or translation of the sheet from the center of the image. The computing device can compute and apply inverse values of the 3D rotation transformation matrix (e.g., a second matrix) to the cropped image to translate or rotate the image. Accordingly, the computing device can transform the cropped image of the sheet to ensure all corners of the transformed image are equidistant from the center of the image.

The computing device can perform warp correction to refine or rectify any crease, folding, rolling, or other uneven surfaces of the document. The computing device can use the warping of each shape to determine the warping of the paper. For example, each shape can represent the outline, trace, indentation, rolls, bent, protrusion, uneven surface, or other irregularities of the paper. The computing device can extract a tensor (e.g., 3D tensor, 3D matrix, or a matrix of arrays) from the shapes including values representing the warps of the paper. The computing device can select the shapes or determine the values based on depth analysis of the paper (e.g., shadow or indications of creases on the paper). By using the inverse of the tensor, the computing device can reverse the warping and output a flat image of the paper for processing.

In some implementations, the aforementioned process can involve the computing device converting a cropped 2D image of the paper to a 3D representation for translation or rotation. The computing device can detect or identify protrusion or indentation on the image (e.g., warp or roll) using depth analysis on the image. By reversing the translation, rotation, and warp in 3D perspective, the computing device can convert the 3D representation back to a 2D field, for storage in a data repository (e.g., local to the computing device or on a remote server). The computing device can receive or retrieve the perspective correct image of the paper for grading.

The computing device can encode question context in the rendered question. The question context can include any information related to each question on a sheet. The question context can allow retracing of the steps to understand the question details for retrieval and auto-grading. The computing device can retrieve, identify, generate, or determine an entry identifier (e.g., question identifier), a user identifier associated with a user printing the document (e.g., can be referred to as a printing user identifier), entry fingerprint, and entry format. In this case, the user identifier can be an individual generating the question, assigning the sheet, or encoding the sheet with questions and optical codes. The entry fingerprint can include at least a timestamp of when the sheet was printed, an identification of a user that printed the sheet, and a device hash or printer identifier the sheet was printed from. In some cases, the timestamp can indicate the time the question was generated or when the optical code or the question was printed on the sheet. The entry format can include an entry field (e.g., entry format or format enum) and a randomization seed value (e.g., a randomization hash). The computing device can hash at least the entry identifier, the user identifier, the entry fingerprint, and the entry format. The computing device can calculate a hash value where the hash can be stored in a database at an address corresponding to the hash value. The computing device can sign the hash with a secret key. The secret key may not be shared with other devices or servers. The computing device can generate or construct an optical code (e.g., QR code, Datamatrix code, Aztec, among other barcodes) using at least the entry identifier, the user identifier, the hash value, and the secret key. The computing device can print the optical code along with the associated entry on the sheet.

Individuals can scan the document with the optical code. The computing device can receive the scan sent from a mobile device of an individual. In some cases, the scan of the document can be sent from a scanner. The computing device can decode the question context from the optical code presented in the document. The computing device can receive and perform perspective correction on an image of the document. The computing device can extract a hash value, a first entry identifier, and a first user identifier (e.g., printing user identifier) from one or more optical codes in the document. The computing device can navigate to the hash stored at an address corresponding to the hash value. The computing device can sign the hash with a secret key. The secret key can be different from the secret key used to sign the hash during the encoding process. Once validated, the computing device can retrieve a second entry identifier and a second user identifier from the hash, among other elements. The computing device can compare between the first entry identifier and the second entry identifier, and between the first user identifier and the second user identifier. If matched, the computing device can retrieve entry coordinates to extract the answer from the worksheet. Any validation failures of the aforementioned, the computing device can transmit a notification or an error message to the client device (e.g., the device used to transmit the document). Thus, by performing perspective correction and encoding/decoding the machine-readable document, the systems and methods described herein can automate grading assignments in any format, layouts, and input options. The systems and methods described herein can thereby reduce resource consumption (e.g., from utilizing specialized sheets or equipment for automated grading), improve accuracy or reduce erroneous in grading answers (e.g., using incompatible input options or slight format blunder), and increase efficiency in grading worksheets by enabling remote uploads and gradings of assignment using commodity image capturing devices rather than manually using scanning machines to grade the assignments.

Figure 2:
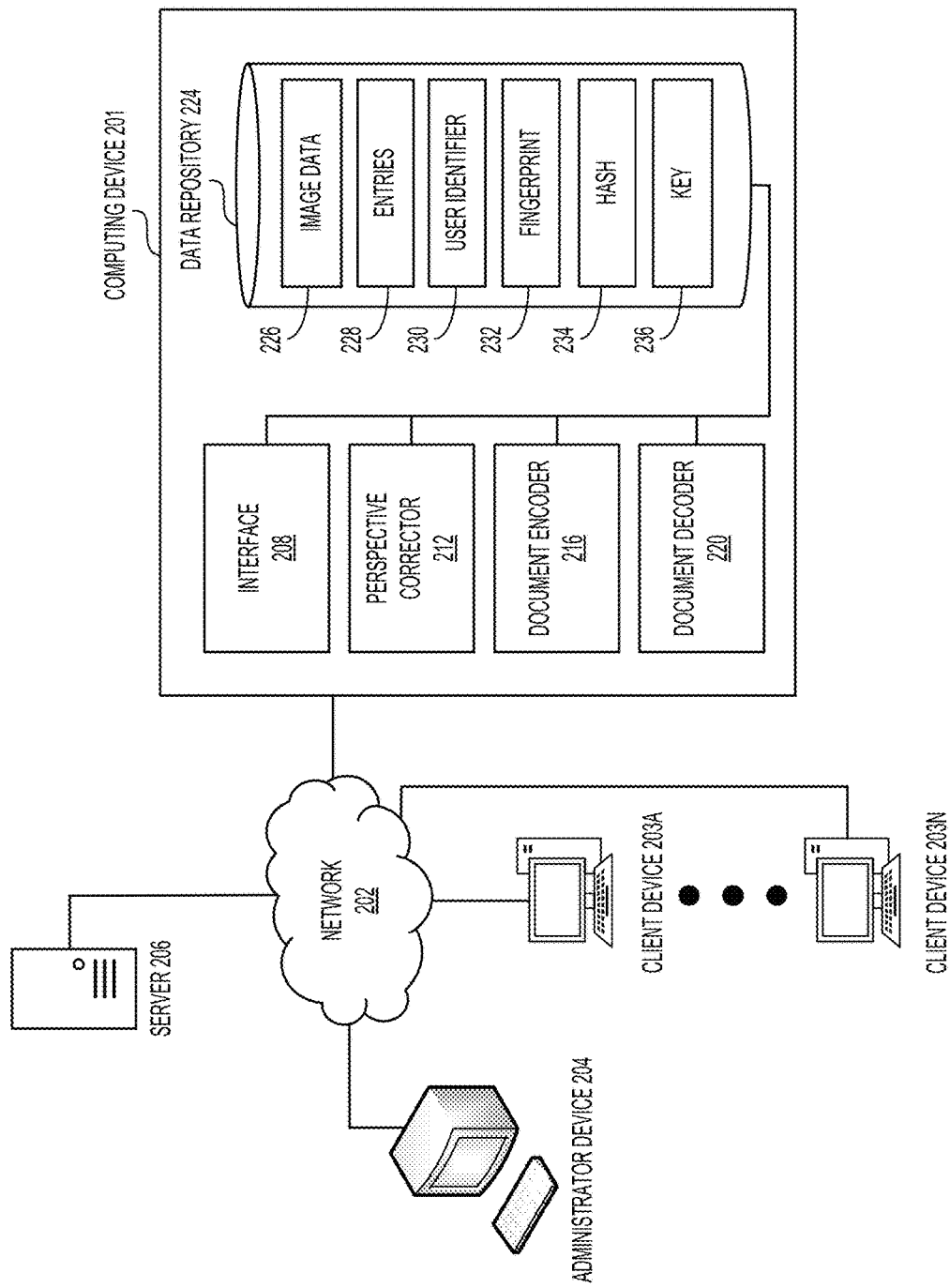
FIG. 2 is a block diagram of an example system for automatically grading worksheets, in accordance with one or more implementations.

Referring now to FIG. 2, a block diagram of an example system for automatically grading worksheets, in accordance with one or more implementations. The system 200 can include at least one computing device 201 (e.g., data processing system or automated grading system), at least one network 202, one or more client devices 203A-N (sometimes generally referred to as client device(s) 203), at least one administrator device 204, and at least one server 206. The one or more components of the system 200 (e.g., the computing device 201, the network 202, the client device 203, the administrator device 204, or the server 206), or one or more components of the computing device 201 (e.g., interface 208, perspective corrector 212, document encoder 216, document decoder 220, or data repository 224) can perform, execute, or otherwise carry out features and functionalities of the systems and methods described herein, such as in FIG. 1 and FIGS. 3-5.

Each of the components (e.g., the computing device 201, the network 202, the client device 203, the administrator device 204, or the server 206) of the system 200 can be implemented using the hardware components or a combination of software with the hardware components of a computing system, such as the computing system 100 detailed herein in conjunction with FIGS. 1A-1D, or any other computing system described herein. Each of the components of the computing device 201 can perform any of the functionalities detailed herein.

The network 202 can include computer networks such as the Internet, local, wide, metro or other area networks, intranets, satellite networks, other computer networks such as voice or data mobile phone communication networks, and combinations thereof. The computing device 201 of the system 200 can communicate via the network 202, for example, with one or more client devices 203, the administrator devices 204, or the server 206. The network 202 may be any form of computer network that can relay information between the computing device 201, the one or more client devices 203, and one or more information sources, such as web servers or external databases, amongst others. In some implementations, the network 202 may include the Internet and/or other types of data networks, such as a local area network (LAN), a wide area network (WAN), a cellular network, a satellite network, or other types of data networks. The network 202 may also include any number of computing devices (e.g., computers, servers, routers, network switches, etc.) that are configured to receive and/or transmit data within the network 202. The network 202 may further include any number of hardwired and/or wireless connections. Any or all of the computing devices described herein (e.g., the computing device 201, the one or more client devices 203, the administrator device 204, the computer system 100, etc.) may communicate wirelessly (e.g., via WiFi, cellular, radio, etc.) with a transceiver that is hardwired (e.g., via a fiber optic cable, a CAT5 cable, etc.) to other computing devices in the network 202. Any or all of the computing devices described herein (e.g., the computing device 201, the one or more client devices 203, the administrator device 204, the computer system 100, etc.) may also communicate wirelessly with the computing devices of the network 202 via a proxy device (e.g., a router, network switch, or gateway). In some implementations, the network 202 can be similar to or can include the network 104 or the cloud 108 described herein above in conjunction with FIGS. 1A and 1B.

Each of the client devices 203 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The client devices 203 can include one or more computing devices or servers that can perform various functions as described herein. The one or more client devices 203 can include any or all of the components and perform any or all of the functions of the computer system 100 described herein in conjunction with FIGS. 1A-1D. The client devices 203 can be, or can be similar to, the client devices 102 described herein above in conjunction with FIGS. 1A-1D.

Each client device 203 can include, but is not limited to, a television device, a mobile device, smart phone, personal computer, a laptop, a gaming device, a kiosk, or any other type of computing device. Each client device 203 can be implemented using hardware or a combination of software and hardware. Each client device 203 can include a display device that can provide visual information, such as information presented as a result of executing instructions stored in the memory of the client device 203. The display device can include an liquid-crystal display (LCD) device, an organic light-emitting diode (OLED) display, a light-emitting diode (LED) display, a bi-stable display (e.g., e-ink, etc.), amongst others. The display device can present one or more user interfaces to various regions of the display in accordance with the implementations described herein. In some implementations, the display device can include interactive elements, such as a capacitive or resistive touch sensor. Thus, the display device can be an interactive display (e.g., a touchscreen, a display, etc.), and can include one or more input/output (I/O) devices or interfaces. Each client device 203 can further include or be in communication with (e.g., via a communications bus coupled to the processors of the client devices 203, etc.) one or more input devices, such as a mouse, a keyboard, or digital key pad, among others. The display can be used to present one or more applications as described herein, such as web browsers or native applications. The display can include a border region (e.g., side border, top border, bottom border). The inputs received via the input/output devices (e.g., touchscreen, mouse, keyboard, etc.) can be detected by one or more event listeners, and indicate interactions with one or more user interface elements presented on the display device of the client devices 203. The interactions can result in interaction data, which can be stored and transmitted by the processing circuitry of the client device 203 to other computing devices, such as those in communication with the client devices 203. The interaction data can include, for example, interaction coordinates, an interaction type (e.g., click, swipe, scroll, tap, etc.), and an indication of an actionable object with which the interaction occurred. Thus, each client device 203 can enable a user to interact with and/or select one or more actionable objects presented as part of graphical user interfaces to carry out various functionalities as described herein.

In some implementations, the client device 203 can be a device capable of printing or scanning documents (e.g., printer or scanner). The client device 203 can transmit a copy of a scanned document to the computing device 201 or other components within the system 200 (e.g., other client devices 203, administrator device 204, or the server 206). The client device 203 can receive data packets from the computing device 201 having at least one of a bitmap, print data format (e.g., page layout, size, etc.), images, or print description to construct and print one or more pages of a worksheet. The client device 203 can include a display indicating the operating status of the client device 203, settings, among others.

The client devices 203 can each execute one or more client applications, which can be a web browser or native application. The one or more client applications can cause the display device of one or more client devices 203 to present a user interface. The client devices 203 can communicate with the computing device 201 via at least one of the client applications. For example, the computing device 201 can be a data processing system executing features and functionalities in the client application. The client devices 203 can be remote from the computing device 201, and vice versa. The client devices 203 can transmit, receive, or retrieve documents to or from the computing device 201 by accessing the client application. For example, a client device 203 can execute a client application and log into an account within the client application. Logging into an account can verify that the user is part of an institution (e.g., student at a school). The client device 203 can request access to at least one folder, file, or interface within the client application from the computing device 201. The computing device 201 can verify whether the user of the client device 203 is authorized to access the folder or file. Once approved, the client device 203 can access, download, or view the files or folders, such as assignment sheets or a folder containing the assignments. The client device 203 can transmit a request to print a document to the computing device 201, the request initiated by a user's interaction with a client application interface, for example.

The client device 203 can be a device used by a student generating or printing a worksheet with questions. The client device 203 can be within an institution (e.g., institution device used by a student). The client device 203 can be connected to, or in some cases can include, a printing device for replicating or printing the digital document into a physical document. In some cases, the client device 203 can be a device used by an educator of an institution. For example, the educator using the client device 203 can generate and print the worksheets for students to answer or complete. Requesting to print the worksheet for auto-grading can initiate an encoding process by the computing device 201.

The client device 203 can scan an image of documents using a camera on the client device 203. The client device 203 can use any image capturing application or software installed on the device. In some cases, the client device 203 can apply at least one filter or photo enhancement features automatically using a camera application. The client device 203 can be prompted by the computing device 201 requesting to access an image library stored in a memory of the client device 203. The client device 203 can be prompted by the computing device 201 requesting permission to use the camera function. For example, within a client application, the client device 203 can provide an indication of user interaction with or selection of an upload or scan icon (e.g., to upload the document to the computing device 201). Responsive to the interaction or selection, the client device 203 can receive a notification or a confirmation window allowing the computing device 201 to access at least one of the image libraries of the client device 203 or the camera application (e.g., to activate the camera application for the user to scan the document). The user can capture an image of the sheet using the camera of the client device 203. The client device 203 can transmit the image to the computing device 201 for processing.

The client device 203 can receive status updates for uploading the document, such as decoding status, grading status, or review progress. For example, after uploading the document, the client device 203 can receive a notification indicating a time until the review or grading process is completed (e.g., 1 minute, 5 minutes, 10 minutes, etc.). The review or grading time can be updated every second or minute, for example, based on notification settings (e.g., configured by the student in the client application or an administrator of the computing device. The client device 203 can be notified of any error during the process of grading the assignment. For example, the computing device 201 can determine that at least a portion of an open-ended answer is illegible due to at least one of unclear handwriting, unclear marking unrecognized by the computing device 201, among other irregularities. In this case, the client device 203 can be a student device submitting an assignment to be graded.

The client device 203 can receive the notification responsive to uploading the sheet (e.g., within 30 seconds, 1 minute, or 2 minutes). The client device 203 can receive the notification subsequent to the computing device 203 performing initial inspection or analysis of the document for illegibility issues, absence of markings (e.g., no answers for at least one of the questions), or erroneous format (e.g., multiple answers for a multiple-choice question). For example, the client device 203 can be prompted by the computing device 201 to correct the errors or acknowledge to proceed with the potential errors. The client device 203 can receive markings or highlights indicating the pages or portions of the pages with potential errors or illegibilities that may seek user attention. In some cases, the client device 203 may not be notified of any potential errors, incorrect formatting (e.g., multiple answers selected in a multiple-choice question), or illegible writings. For example, the computing device 201 can be configured not to assist the students in correcting their potential mistakes. Instead, the computing device 201 can notify or highlight these irregularities for the educator to further assess.

The student device can upload sheets to a classroom folder, private from other students. The folder or files can be viewed or accessed by each individual uploader or creator of the folder (e.g., the educator). In some cases, all students can upload the documents to the same folder created by an educator, but may not be allowed to open the folder. Instead, each student can view, configure, or upload their uploaded file without accessing other files in the folder.

In some cases, the client device 203 can be an educator device used by an educator to track document statuses of one or more students. For example, the educator device can access the client application similar to the student device. The educator device can sign into an account having an educator privilege, which can admit accounts (e.g., student or other educator accounts) to access files or folders uploaded by the educator device. The educator device can create a private folder with indications of file slots associated with each student, where subsequent to the student uploading a completed sheet, the sheet can be stored in a file slot associated with the respective student. The educator device can receive notifications (e.g., per setting or configuration) following at least one of an uploaded document, re-uploaded document, messages from student device(s), among other new events. Based on a deadline or time limit of an assignment, the educator device can be notified of one or more students that have yet to complete or upload the assignment. In which case, the student device can receive an indication to complete or upload the assignment prior to the time limit.

The educator device can receive notifications or highlights (e.g., within a page) of papers with errors or illegible writing submitted by the student device. The educator device can receive notifications indicating other irregularities (e.g., unusual marking, terms, or drawings) within papers submitted by the students. The notification can appear within the client application for the educator account, requesting attention to one or more documents. In some cases, if the irregularities are common among sheets submitted by different students, the educator device can receive a set, a list, or a group indicating the common error, potential fault, or unclear/illegible writings. The educator device can confirm to ignore the error (e.g., once or all error of selected type), remember or add the irregularities (e.g., false positive or false negative notification), or view the error within a document. The educator device can provide comments to sheets uploaded to the client application. For example, the educator device can access a folder (e.g., classroom folder or educator folder) within a client application where documents from students are uploaded or stored. Each document may not be shared or visible to other students other than the uploader. The educator can view all documents uploaded by each student. The educator can provide comments or feedback digitally in the document (e.g., digitally writing or drawing on the sheets) or via text or messaging interface inside the client application. The educator device can upload the comments to the computing device 201, where the computing device 201 can transmit the comments to a respective student device for display via the user interface of the client application. In some cases, if the student provides notes for educators, the computing device 201 can highlight, put emphasis, or box the notes for the educator device. The educator device can request to print one or more documents.

The administrator device 204 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The administrator device 204 can include one or more computing devices or servers that can perform various functions as described herein. The administrator device 204 can include any or all of the components and perform any or all of the functions of the computer system 100 described herein in conjunction with FIGS. 1A-1D. The administrator device 204 can be, or can be similar to, the client devices 102 described herein above in conjunction with FIGS. 1A-1D.

The administrator device 204 can be similar to one or more of the client devices 203 described above and can include any of the hardware components of the client devices 203, as well as perform any of the functionalities of the client devices 203 as described herein. The administrator device 204 can be operated by an administrator to manage, for example, the computing device 201, a server 206, or one or more client applications executing on the server 206. In some cases, the administrator can be an administrator of an institution supervising or monitoring the educators. The administrator device 204 can be used to access an administrator account having access to settings and configurations of the computing device 201 or the client applications. For example, the administrator device 204 can access software components of the computing device 201 or at least one server 206 to configure at least the codes or scripts used to perform features and functionalities of one or more components of the computing device 201 or the server 206. The administrator device 204 can configure the appearance and features displayed on the user interface of a client application. The administrator device 204 can transmit software updates to one or more components of the system 200 (e.g., the computing device 201, the client device(s) 203, or the server 206). The administrator device 204 can configure the operations for decoding or encoding machine-readable documents. In some cases, the administrator device 204 can configure the layout, format, among other elements of a document for students and educators. For example, a first administrator device can provide a predetermined document structure for a subset of educators and a second administrator device can provide another predetermined document structure for a different subset of educators.

The server 206 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The server 206 can include any or all of the components and perform any or all of the functions of computer system 100 described herein in conjunction with FIGS. 1A-1D. The server 206 can be, or can be similar to, the server 106 described herein above in conjunction with FIGS. 1A-1D.

The server 206 can communicate with the computing device 201, the client device 203, or the administrator device 204 via the network 202. The server 206 can operate remotely from the client device 203 and the computing device 201. The server 206 can be, or be similar to, an application server, a database server, a virtual server, a proxy server, among others. The server 206 can provide a software service to the client devices 203. For example, the server 206 can receive a request to access a client application remote from a client device 203. The server 206 can authorize or reject the request from the client device 203 based on a list of verified user accounts. The server 206 can execute a client application and provide a virtual desktop for the client device 203 to access the user interface of the client application. The server 206 can receive inputs from the client device 203 via the client application. In some cases, the client application can be executed locally on the client device 203. The server 206 can provide one or more updates to the client device 203 upon request to access a client application. For example, the server 206 can receive a request to access the local client application. Responsive to the request, the server 206 can transmit a script configured to be executed on the client device 203 to update the client application.

In some implementations, the server 206 can include one or more features and functionalities of the computing device 201. For example, the server 206 can receive tasks delegated from the computing device 201, such as pre-processing data received from the client device 203, perform perspective correction, encoding machine-readable documents, or decoding machine-readable documents. The server 206 can include a remote data storage to store information received from the computing device 201, the client device 203, or the administrator device 204. For example, the server 206 can store data similar to the data repository 224 of the computing device 201.

In some cases, the server 206 can receive data packets from the client device 203 (or the administrator device 204) and forward at least a portion of the data packets to the computing device 201 for processing. For example, the server 206 can receive a new worksheet having questions from a client device 203 (e.g., educator device). The server 206 can receive a request to print the worksheet from at least one client device 203 (e.g., either educator device or the student device). The server 206 can forward the worksheet to the computing device 201 for encoding the worksheet. The server 206 can receive an encoded document from the computing device 201 and transmit it to the client device 203 to download or print. In further example, the server 206 can receive an answered worksheet from a client device 203 (e.g., a student device). The server 206 can forward the answered worksheet to the computing device 201 to decode. The server 206 can receive decoded information of the worksheet from the computing device 201. The server 206 can further receive an analysis and grading of the answers from the computing device 201. The server 206 can store the information from the computing device 201 in a remote data storage. The server 206 can transmit the result to the client device 203 or display the result in a user interface of a client application. Accordingly, the server 206 can perform one or more features and functionalities of the computing device 201, and the computing device 201 can perform one or more features and functionalities of the server 206.

The computing device 201 can include at least one processor and a memory, e.g., a processing circuit. The memory can store processor-executable instructions that, when executed by the processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The computing device 201 can include one or more computing devices or servers that can perform various functions as described herein. The computing device 201 can include any or all of the components and perform any or all of the functions of the computer system 100 described herein in conjunction with FIGS. 1A-1D. The computing device 201 can include components and perform any or all of the features and functionalities of at least one server 206.

The computing device 201 can be referred to as an auto-grading system, document encoding system, document decoding system, or a data processing system. The computing device 201 can be connected to other devices or components within the system 200 via the network 202. The computing device 201 can transmit or receive data (e.g., information or data packets) to or from the client device 203, the administrator device 204, or the server 206. The computing device 201 can process information from other components or devices within the system 200. The computing device 201 can transmit processed information to, for example, the client device 203, the administrator device 204, or the server 206. The computing device 201 can transmit data to at least one of the servers 206 for processing (e.g., delegating tasks or loads to other servers 206). The computing device 201 can pre-process data received from one or more components of the system 200. Pre-processing data can refer to filtering noises, removing unwanted information, transforming or enhancing data, extracting features of the data, among others. In some cases, the computing device 201 can be a remote device similar to the server 206. The computing device 201 can perform features and functionalities described herein to automatically grade worksheets, reduce resource consumption (e.g., from utilizing specialized sheets or equipment for automated grading), improve accuracy or reduce erroneous in grading answers (e.g., using incompatible input options or slight format blunder), and increase efficiency in grading worksheets by enabling remote uploads and gradings of assignment using commodity image capturing devices rather than manually using scanning machines to grade the assignments. The computing device 201 can perform other technical improvements as discussed herein, and as further discussed in FIGS. 3-5.

The computing device 201 can include one or more hardware or software components, such as at least one interface 208, at least one perspective corrector 212, at least one document encoder 216, at least one document decoder 220, and at least one data repository 224. The data repository 224 can be referred to as a data storage, a database, or generally referred to as a memory storage of the computing device 201. The data repository 224 can include data structures storing information received from other components of the system 200 (e.g., client devices 203, an administrator device 204, or a server 206). The data repository 224 can be in electrical communication with or accessed by one or more components of the computing device 201 (e.g., interface 208, perspective corrector 212, document encoder 216, or document decoder 220). The data repository 224 can include at least an image data storage 226 (sometimes referred to as photo storage or client data storage), an entry storage 228 (sometimes referred to as entries storage, answer storage, question storage, or document information storage), a user identifier storage 230 (sometimes referred to as question-user storage, answer-user storage, printer-user storage, or entry-user storage), a fingerprint storage 232, a hash storage 234 (sometimes referred to as a hash table, an address table, or hash value storage), and a key storage 236 (e.g., sometimes referred to as token storage, secret key storage, or cryptographic key storage). Each storage within the data repository 224 can be accessed by one or more components of the computing device 201. In some cases, one or more storage within the data repository 224 can be accessed by other components within the system 200. In some other cases, the one or more storage within the data repository 224 may not be accessed by other components within the system 200.

The image data storage 226 can include, store, or maintain images, photos, or scans of worksheets configured to be encoded, decoded, or graded. For example, the image data storage 226 can store data associated with a worksheet generated or configured by an educator (e.g., using an educator device). The worksheet can be generated using a word processing application. In some cases, the image data storage 226 can store or maintain scans of physical documents from the client devices 203. Scanned documents can be processed into digital format. The documents can be retrieved, downloaded, or configured by one or more client devices 203. The image data storage 226 can store encoded machine-readable documents. The image data storage 226 can be accessed by components of the computing device 201, such as the perspective corrector 212, the document encoder 216, or the document decoder 220. The image data storage 226 can store documents received from the perspective corrector 212, the documents having been cropped, rotated, translated, or enhanced. The image data storage 226 can store encoded documents from the document encoder 216. The image data storage 226 can store decoded data from the document decoder 220.

The data repository 224 can include an entry storage 228. The entry storage can include, store, or maintain entry data (or information) for documents, worksheets, papers, or assignments. The entry data can include texts, images, or other information used to print the worksheets. The entry storage 228 can be accessed by the components of the computing device 201. The entry storage 228 can store entries received from other components of the system 200, such as at least one client device 203, an administrator device 204, or a server 206. The entry storage 228 may be accessed by other components of the system 200, such as to configure various entries for at least one document. In some cases, the entry storage 228 may not be accessed by one or more components of the system 200. For example, the entry storage 228 can store questions of a document. The questions can be provided by a client device 203. The entry storage 228 can be accessed by the client device 203 (e.g., through a client application) to configure, update, or remove one or more entries from the entry storage 228.

The entry storage 228 can include, store, or maintain answers in documents scanned or uploaded by the client device 203 (e.g., student device). For example, after completing a worksheet, a student using a client device 203 can upload the answered worksheet to the computing device 201. The computing device 201 can store the answers extracted from the document into the entry storage 228. The answers can be writings, drawings, or markings presented on the document. The entry storage 228 can contain types of entries in different categories or groups. For example, the entry storage 228 can categorize questions as question entries and answers as answer entries. The entry storage 228 may not include duplicate question entries. Instead, the computing device 201 can associate, identify, or recognize answer entries to their respective question entries of the same document by hashing the entries. In some cases, entries can refer to any text, writing, image, or drawing presented within a document. In some cases, the entries may or may not include optical code printed on machine-readable documents.

The entry storage 228 can store identifications of the entries (sometimes referred to as entry identifiers). The entry storage 228 can store entry formats each associated with an entry identifier. For example, the computing device can use the entry identifier to identify the entry format for a question. The entry format can indicate the question type (e.g., open-ended or multiple-choice), an area or field provided for answering a question (e.g., coordinates of an entry field), or a randomization seed value (sometimes referred to as multiple-choice question ("MCQ") randomization seed to determine the order of a MCQ. The order of the MCQ can refer to an arrangement of the choices or the correct choice among the choices. The entry storage 228 can include an arrangement format of the questions in at least one document. For example, a document printed by each client device 203 can include the same questions but in different arrangements based on the arrangement format. Data from the entry storage 228 can be encoded in an optical code to print on a document.

The data repository 224 can include user identifier storage 230. The user identifier storage 230 can include, store, or maintain identifications of one or more users (e.g., user account or client devices 203). The identifications of the users can be referred to as a user identifier or an account identifier. The user identifier storage 230 can include, store, or maintain user identifiers for at least users generating the entries, users printing the worksheet, or users uploading the worksheet to the computing device 201 for grading. At least one user identifier can be encoded in an optical code. For example, the user identifier storage 230 can store a user identifier corresponding to a client device 203 or user account that generated entries for a document, request to print the document, or uploaded the document to be graded by the computing device 201. The user identifier storage 230 can be used to verify permission or authorization of user accounts to access one or more files or folders within a client application. For example, the user identifier storage 230 can be accessed by a component of the computing device 201 or by the server 206 to retrieve a list of users authorized to access a file or a folder. Based on whether the user identifier is in the list, the computing device 201 or the server 206 can acknowledge or reject an access request from a client device 203.

In some cases, the user identifier storage 230 can store information (sometimes referred to as user information) associated with the client device 203 or user account (e.g., IP address, cookies, device operating system, types of network connection, among others). The user information can include information permitted by the user to store in the user identifier storage 230. Permission from the user can be in the forms of acknowledgment/confirmation of a confirmation box or proceeding to access an application, where the user is previously notified that by using the application, the user agreed to collection or storage of certain data.

The data repository 224 can include fingerprint storage 232. The fingerprint storage 232 can include, store, or maintain a collection of information received from printing a paper, which can generally be referred to as a fingerprint (e.g., print fingerprint or printing information). The fingerprint storage 232 can store or include data from other components of the data repository 224 (e.g., entry storage 228, user identifier storage 230, or hash storage 234) or a collection of addresses associated with a location in the data repository 224 or a remote database of a server 206, such as to retrieve the corresponding information. The fingerprint can be encoded in an optical code for extraction by a decoder (e.g., document decoder 220). For example, a fingerprint can include at least a timestamp (e.g., the time when the worksheet was printed, a client device 203 requesting to print a worksheet, or when the timestamp is used to generate an optical code), a user identifier (sometimes referred to as a printing user identifier) of a user printing the worksheet, and a device identifier of the printer (e.g., sometimes referred to as a printer identifier). The device identifier can include a unique address or values associated with the printer. The fingerprint can be associated with an entry or a question to be printed on a worksheet. The fingerprint can be, or be similar to, a hash of the timestamp, the print user identifier, and the printer identifier.

The data repository 224 can include a hash storage 234. The hash storage 234 can include, store, or maintain at least a hash value or a hash of data (e.g., generally referred to as a hash). The hashed data can include data from the data repository 224 or remote data storage. The hash can be stored in the data repository 224 at an address corresponding to the hash value. Each hash value can be used by the computing device 201 to retrieve a hash from an address corresponding to the hash value. The hash value can be a unique numerical value associated with an address of the data repository 224 or a database. For example, by using the hash value, the computing device 201 can navigate to the address within the data repository 224 and retrieve at least one corresponding hash. The hash value can be encoded into an optical code, which can be printed to a document for extraction. For example, the hash value used for encoding the optical code can be addressed to a hash including at least an entry identifier, a user identifier (e.g., of a user generating the worksheet), a fingerprint corresponding to an entry, and an entry format. The information within a hash can be referred to as elements within the hash. In some cases, the user identifier can be the same as the print user identifier (e.g., the user generating the worksheet is the same as the user printing the worksheet). In some cases, the user identifier can be different from the print user identifier. The entry format can include at least a randomization seed value or identify coordinates of an entry field (e.g., a portion of a page for answering the associated question). The hash can include other information associated with the entry or the document the hash is being used for.

The hash may not include duplicated data from the data repository 224 or other databases. The hash can include multiple hash values associated with addresses of the data repository 224. For example, the hash value can be used by a computing device 201 to retrieve a hash of various other hash values. Using these hash values from the hash, the computing device 201 can retrieve, for example, at least the entry identifier, the entry format, or the entry fingerprint. The hash can be an array or list of values. For example, having the above elements, the hash can be [entry identifier; user ID; print fingerprint; entry format], among other arrangements or inclusion of elements.

The data repository 224 can include a key storage 236. The key storage 236 can include, store, or maintain a secret key (sometimes referred to as a token, a cryptographic key, or a signature). The secret key can be used by at least one component of the computing device 201 to encode or decode a document. For example, the secret key can be used by a document encoder 216 to sign a hash. The secret key can be used by a document decoder 220 to extract the hash or elements of the hash from an optical code of the document. The secret key used for encoding the document can be different from the key used to decode the document, such as an encryption key and a decryption key or a public key and a private key. For example, after receiving a request from a client device 203 to print a document, the computing device 201 can encode the document with an optical code having a hash signed with a first key. To extract the hash, the computing device 201 can use a second key to decrypt the hash from the optical code. In this case, the first key can be a public key used by one or more client devices 203. The second key can be a secret key, not shared with other devices of the system 200.

The computing device 201 can include at least one interface 208. The interface 208 can be in electrical communication with one or more components of the computing device 201. The interface 208 can include hardware, software, or a combination of hardware and software components to interface with the network 202, devices within the system 200 (e.g., client device 203 or administrator device 204), or components of the computing device 201. The interface 208 can include features and functionalities similar to the network interface 118 to interface with the aforementioned components. For example, the interface 208 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 208 can include at least a built-in network adapter, network interface card, PCMCIA network card, EXPRESSCARD network card, card bus network adapter, wireless network adapter, USB network adapter, modem or any other device suitable for interfacing one or more devices within the system 200 to any type of network capable of communication. The interface 208 can transmit or receive information from one or more aforementioned components to perform features and functionalities discussed herein, such as perspective correction, encoding documents, decoding documents, or auto-grading documents.

The interface 208 can receive data packets from one or more devices within the system 200 (e.g., the client device 203, the administrator device 204, or the server 206). The interface 208 can transmit data packets to the one or more devices. For example, the interface 208 can receive questions or entries (or an indication of the entries stored in the data repository 224) from a client device 203, such as an educator device, for generating a worksheet. The interface 208 can receive a request from a client device 203, such as either an educator device or a client device, to print a worksheet having the entries. The interface 208 can receive image data from the client device 203, such as the student device, having an answered document within an image frame. The interface 208 can receive other files or data uploaded by the client device 203. The interface 208 can forward data packets to other components within the computing device 201 (e.g., the perspective corrector 212, the document encoder 216, the document decoder 220, or the data repository 224). In some cases, the data packets can include a source address and destination address, such that the interface 208 can forward the data packets to an appropriate device or component within the system 200 or the computing device 201.

The interface 208 can transmit notifications or messages to devices (e.g., the client device 203 or the administrator device 204) within the system 200. The notification or message can be displayed in a user interface of a client application. For example, the interface 208 can receive a grade associated with an assignment submitted or uploaded by the user account executing on the client device 203. The interface 208 can transmit an indication of a score or grade to the client device 203. In some cases, the interface 208 can transmit a script configured to be executed on the client device 203, where responsive to executing the script, the client application is configured to display a score associated with an assignment. In further example, the interface 208 can transmit other types of notifications to client devices 203, such as an error message, status updates for downloading, uploading, or saving documents, the status of the client application, progress for completing assigned tasks, among others.

The computing device 201 can include a perspective corrector 212. The perspective corrector 212 can be in electrical communication with other components of the computing device 201. The perspective corrector 212 can perform perspective correction on an image. For example, the perspective corrector 212 can receive an image from a client device 203. The image can include a worksheet with one or more questions answered (e.g., by the student uploading the worksheet). The perspective corrector 212 can perform perspective correction on an image before extracting answers from the worksheet. The perspective corrector 212 can perform one or more levels of perspective correction, including at least cropping, translation or rotation, or warp correction. The perspective corrector 212 can perform each level of perspective correction by placing representational markers (e.g., digital shapes or indications) along the borders of the worksheet. The perspective corrector 212 can select or choose a predetermined shape to indicate the borders, boundaries, edge, sides, among other visible characteristics of the worksheet. The shape can include at least one of a rectangle, a trapezoid, a parallelogram, a right-angled bracket, among others. The perspective corrector 212 can adjust or select a different shape according to the characteristics of the worksheet (e.g., position or deformation of the worksheet, or camera angle used to capture the image).

For example, the perspective corrector 212 can select and apply a rectangle to the boundaries of a paper within an image frame. The shape can encapsulate the paper within the image. To differentiate between a paper or other objects or background elements to select and apply the representation markers, the perspective corrector 212 can use an image recognition technique or an edge detection technique. For example, using an image recognition technique, the perspective corrector 212 can identify whether a paper is within the image or other elements in the frame (e.g., the surface of a table, floor, among other objects). By identifying the paper, the perspective corrector 212 can apply the shape to the portion of the image detected as a paper. In some cases, using the image recognition technique, the perspective corrector 212 can determine whether an optical code is present on the paper. If the optical code is not present on the paper, the perspective corrector 212 may not correct or enhance the image of the paper. Otherwise, the perspective corrector 212 can proceed to apply one or more levels of perspective correction, as discussed herein. In some cases, the perspective corrector 212 can use edge detection to select predetermined shapes or representation markers. The perspective corrector 212 can apply the selected representation markers along the boundaries of the paper based on the detected edges.

The perspective corrector 212 can crop the area within the boundaries surrounded by the representation markers (e.g., the predetermined shapes). In other words, the perspective corrector 212 can crop the paper from the entire image frame based on or using the representation markers. By cropping the paper from the image frame, additional image data around the worksheet may be captured, such as pencil/pen marking around the border of the paper. In some cases, the perspective corrector 212 can crop the border of the image (e.g., 0.5 inches or 1 inch from the edge of the paper). In some other cases, the perspective corrector 212 may not crop any portion of the paper, where each portion can include a part of an answer.

The perspective corrector 212 can select or choose the markers or shapes such that their orientation and size relative to each other allow extraction of a 3D rotation matrix or a 3D transformation matrix. For example, the perspective corrector 212 can apply shapes in different orientations around the boundaries of the paper. If the shapes are right-angled brackets, each shape can be rotated in any degree to accommodate for the edges of the paper (e.g., 90 degrees, 180 degrees, or 370 degrees). If the shapes are at least one of a trapezoid or a parallelogram, the angle of each of the edges may be manipulated or configured to fit with the boundaries of the paper. The shapes can be 3D shapes, such as a cuboid, triangular prism, parallelepiped, trapezohedron, among others. The perspective corrector 212 can extract a 3D rotation transformation matrix from the shapes selected or applied to the image (e.g., paper within the image). Once extracted, the perspective corrector 212 can apply one or more rotation or translation techniques to rotate or translate the paper, such that once corrected, all corners of the transformed image are equidistant from the center of the image. For example, each shape can be represented with one or more unit vectors, where the perspective corrector 212 can extract the 3D rotation transformation matrix from the vectors based on the selected representation markers. The perspective corrector 212 can determine the inverse of the 3D rotation transformation matrix. The perspective corrector 212 can apply this inverse to the cropped image (e.g., the image of the paper) to translate or rotate the paper. By applying translation or rotation to the image, the perspective corrector 212 can correct for 3D rotation or translation of the worksheet relative to the plane of the camera (e.g., camera angle, distance from the paper, distortion, among other camera effects).

The perspective corrector 212 can determine the warping of the paper based on the representation markers. The warping can refer to any crease, indentation, folds, among other damages or distortion on the paper. For example, the perspective corrector 212 can apply representation markers within the boundaries of the paper, where there are folds, indentation, bulges, or other irregularities on the paper. The perspective corrector 212 can extract a tensor from the representation markers indicating areas of the warpings. The tensor can refer to a 3D matrix or matrix of arrays based on the vectors of the representation markers. The perspective corrector 212 can calculate or determine the inverse of the tensor. The perspective corrector 212 can apply the inverse of the tensor to the representation markers on the paper to reverse the warping, thereby flattening the image of the paper for processing. The warping correction can be a process for flattening the image that may have been rolled or folded by the user uploading the image.

In some cases, the perspective corrector 212 can receive an image from the client device 203 without a worksheet. For example, the student device can upload multiple images of the worksheet, where each image can include a page of the worksheet. If the perspective corrector 212 identifies an image without a page of the worksheet (e.g., nothing to crop), the perspective corrector 212 can skip the image or may not perform any level of perspective correction on the image. In some cases, the perspective corrector 212 may not perform image correction to duplicate images. For example, the client device 203 can upload the same image (e.g., indicated by the saved timestamps when the image was captured, size of the image, image identifier, among others). Based on identifying that the image is duplicated, the perspective corrector 212 can perform perspective correction to one of the duplicated images, thereby allowing the document decoder 220 to decode one image and not the duplicated image, for example.

In some implementations, the perspective corrector 212 can identify, prior to performing perspective correction, that the worksheet does not include any answer. For example, the perspective corrector 212 can deploy image analysis, object detection technique, or natural language processing ("NLP") to determine that no answers were provided in the uploaded worksheet. In this example, the perspective corrector 212 may identify the questions printed in the worksheet without a corresponding answer. Accordingly, the perspective corrector 212 may not perform perspective correction on at least a portion of the worksheet. The portion can refer to an entry field or the entire worksheet if no answers are present.

In some implementations, the perspective corrector 212 can perform correction on one or more portions of the paper without performing correction on at least one other portion of the paper. For example, the perspective corrector 212 can identify areas with or without texts, writing, or drawing. If the perspective corrector 212 identifies an area without any elements or context, that area may be skipped. Otherwise, if there's an element at the area, the perspective corrector 212 can perform at least one correction procedure (e.g., image crop, translation, rotation, or anti-warp). Therefore, based on whether an image, text, or writing is present on the paper, the perspective corrector 212 may or may not correct the respective portion of the paper.

The computing device 201 can include a document encoder 216. The document encoder 216 can be in electrical communication with other components of the computing device 201. The document encoder 216 can generally be referred to as encoder 216. The encoder 216 can encode question context (sometimes referred to as entry context) in or next to the rendered question. For example, the encoder 216 can encode entry context in the form of an optical code, such as a QR code or other bar codes to be rendered next to the question on the worksheet. By encoding the entry context, the encoder 216 can allow the document decoder 220 to retrace and retrieve question details associated with the optical code for auto-grading the worksheet. The encoder 216 can receive or retrieve entry context from the data repository 224. The entry context can be configured by an educator. For example, the educator can provide multiple entries for rendering in a worksheet for printing by one or more client devices 203. Responsive to receiving the entries, the encoder 216 can generate at least an entry identifier and a user identifier of the educator providing the question, which can be stored in association to the entry in the data repository 224. For each entry, the educator can provide a corresponding entry context to indicate at least the format of the entry, answers to a multiple-choice question, or a listing or an order of the entries. To associate or link each entry to its corresponding information or entry context, the encoder 216 can hash the entry context with the entry and generate a hash value to retrieve the hash from an address of the database (or data repository 224) indicated by the hash value, for example.

To encode the entry context, the encoder 216 can hash an entry identifier, user identifier, fingerprint, and entry format. The entry identifier (sometimes referred to as a question identifier) can be an identification of an entry (or question) rendered in the worksheet. The user identifier can be associated with a user account or client device 203 generating the worksheet. The fingerprint (sometimes referred to as print fingerprint) can include at least a timestamp (e.g., when the worksheet is printed), a user identifier (e.g., of a user printing the worksheet), and a device identifier (e.g., device hash or a printer identifier of the device printing the worksheet). The user identifier included in the fingerprint may or may not be the same as the user identifier of the user generating the worksheet (or the user creating the question or entry).

The entry format can include at least a randomization seed value (e.g., multiple-choice randomization hash), format enum (sometimes referred to as format type or question type), or entry coordinates (e.g., coordinates of an entry field). The randomization seed value can indicate or be used to determine the order of the multiple-choice question. The order of the multiple-choice question can refer to the sequence of answers rendered for the multiple-choice or an indication of a correct answer for the multiple-choice. The format enum can indicate the type of question associated with the entry, such as a multiple-choice type or an open-ended type. The entry coordinates can indicate a portion, a field, or an area on the paper (e.g., size of the area after an entry) where the user can provide an answer to the question. In some cases, the entry coordinates can be a part of the format enum. The encoder 216 can retrieve entry context stored or maintained in the data repository 224. In some cases, the encoder 216 can generate additional entry context responsive to a print request from a client device 203. For example, responsive to receiving a request to print a worksheet, the encoder 216 can generate and encode print information (e.g., the fingerprint) into an optical code for rendering or printing on a worksheet.

The encoder 216 can hash the aforementioned elements, such as the entry identifier, user identifier, fingerprint, and the entry format. For example, the encoder 216 can group the elements into a hash of [entry identifier; user identifier; fingerprint; entry format]. Each element in the hash can be an address or a value linking to the address in a database. The encoder 216 can calculate a hash value from the hash of elements, where the hash value can correspond to an address in the database (e.g., data repository 224) to store, maintain, or retrieve the hash. The encoder 216 can digitally sign the hash using a secret key from the data repository 224. The secret key used to sign the hash for encoding a worksheet can be a public key. In some cases, instead of signing the hash, the encoder 216 can sign the hash value, such that the hash value has to be decrypted prior to accessing the hash stored at the address corresponding to the hash value. The hash value can act as a key to access the hash.

Using one or more of at least the entry identifier, the user identifier, the hash value, and the secret key used to sign the hash (or the hash value), the encoder 216 can generate an optical code for the entry. The encoder 216 can encode any other data associated with the entry into an optical code, such as the field of the entry (e.g., coordinates on the worksheet where the entry is printed), entry language, or entry answer format (e.g., indicating the type of answer expected, such as a numerical answer or text answer). The encoder 216 can print the optical code and the entry onto a worksheet. In this case, printing the optical code and the entry can refer to designated, rendering, or placing the optical and the entry onto the worksheet prior to physically printing the worksheet via a printing device (e.g., a device having the device identifier included in the fingerprint). Printing the optical code and the entry onto the worksheet can refer to digitally assigning the elements at a location on the worksheet. By digitally assigning these elements, the computing device 203 can provide a preview of the worksheet before printing the paper using a printer, for example. The encoder 216 can assign the optical code at any location in proximity of the entry, such as the left side or the right side of the entry. In some cases, the encoder 216 can assign the optical code to the top or the bottom of the entry.

In some implementations, the encoder 216 can generate optical codes for multiple entries sequentially or simultaneously. For example, for each step in the process of generating an optical code for each entry, the encoder 216 can perform a first step (e.g., calculating a hash value) for multiple entries prior to proceeding to a second step (e.g., storing the hash at an address corresponding to the hash value or generating an optical code) for the entries. In some cases, the encoder 216 can perform a first set of features and functionalities (e.g., generate a first optical code) for a first entry prior to performing a second set of features and functionalities (e.g., generate a second optical code) for a second entry. The encoder 216 can print or assign multiple entries and optical codes associated with the entries within a single page of the paper. In some cases, the encoder 216 can extend one or more entries and one or more associated optical codes to second or other pages of the paper.

In some implementations, the encoder 216 can encode an entry randomization hash as part of the optical code. The entry randomization hash can indicate the order or listing of the entries rendered to the worksheet. The entry randomization hash corresponding to each entry can indicate the address within a database the entry was retrieved from. In some cases, the entry randomization hash can be used to retrieve an answer corresponding to the entry. For example, the encoder 216 can receive a set of entries from the data repository 224 to generate the worksheet. Each entry can be stored at an address corresponding to the entry randomization hash. The answer corresponding to each entry can be hashed together with the entry (e.g., stored at the same address). The encoder 216 can randomly populate the entries in any order or based on an arrangement configured by an educator. With each entry, the encoder 216 can encode the entry randomization hash in the optical code, such that when decoded, the answer provided by the uploader can be compared to the answer stored in the data repository at an address corresponding to the entry randomization hash.

In some implementations, the encoder 216 may not print or assign an optical code at a location near, adjacent to, or in the proximity of an entry. For example, the computing device 201 can be configured such that all optical codes are present on the first page of a document. Therefore, for entries subsequent to the first page, the encoder 216 can provide entry context for all the entries in the document on the first page of the document. The computing device 201 can associate each of the optical codes to their associated entry. For example, the encoder 216 can encode an entry number into the optical code such that when extracted, the computing device 201 can determine the entry associated with the optical code or entry context. To determine the entry number of each entry, the computing device 201 can perform at least one optical analysis technique on the entries of the worksheet, such as optical character recognition or other image recognition features. In this case, the encoder 216 can print an entry number next to or near an entry (e.g., to the left or the right of the entry). In some implementations, the encoder 216 may replace the entry number with an optical code corresponding to the entry used to determine the entry context. Each of the aforementioned elements (e.g., the entry, the entry identifier, the user identifier(s), the fingerprint, the entry format, among others) can be stored in the data repository 224. In some cases, each of the aforementioned elements can be stored in a remote database on the server 206. In some implementations, the encoder 216 can encode the document with a single optical code, where the single optical code can include at least various groups of elements, each group representing an entry context of an entry. Therefore, after analyzing the answers, the computing device 201 can associate or link each answer to their corresponding entry and entry context based on the information extracted from the single optical code.

The computing device 201 can include a document decoder 220. The document decoder 220 can be in electrical communication with other components of the computing device 201. The document decoder 220 can generally be referred to as decoder 220. The decoder 220 can perform one or more features and functionalities independently or in conjunction with other components of the computing device 201. The decoder 220 can perform the features or functionalities to decode (or decrypt) one or more optical codes within a document. The decoder 220 can receive a scanned document from the client device 203 (e.g., using the camera of the client device 203). The document can be in any image file format, such as JPEG, TIFF, PDF, raw image format, among others. The document can be perspective corrected by the perspective corrector 212 prior to the decoder 220 receiving the image. Hence, the decoder 220 can receive a cropped, rotated, translated, or warp corrected image of the document.

The decoder 220 can identify at least one optical code on the page of the document. The decoder 220 can extract the optical code from the page. By extracting the optical code, the decoder 220 can identify or retrieve at least an entry identifier, a user identifier (e.g., the user who generated the worksheet or printed the worksheet), a hash (or a hash value), and a secret key used to sign the hash. The decoder 220 can identify or retrieve any other entry context from the optical code, such as information encoded by the encoder 216. The decoder 220 can extract a hash using the hash value. For example, the decoder 220 can access an address of a database corresponding to the hash value and retrieve the hash stored at the address. The decoder 220 can sign the hash using a secret key. The decoder 220 can use the same secret key extracted from the optical code. In some cases, the decoder 220 can use another secret key (e.g., private key or decryption key) stored in the data repository 224. For example, the hash can be signed using a first secret key having been paired with a second secret key stored in the data repository 224. To extract content from the hash, the decoder 220 can use the second secret key stored in association with or as a pair of the first secret key. Therefore, the decoder 220 can sign the hash with a secret key for validation.

In some cases, the hash value can be signed using a secret key. For example, to validate the hash, the decoder 220 can sign the hash value using a secret key (e.g., either the same as the extracted secret key or another secret key stored in the data repository 224). In some cases, the hash and the hash value can refer to the same numerical value corresponding to or used to identify the address in the database storing one or more entry context or elements hashed by the encoder 216. After the validation, the decoder 220 can perform a lookup at an address in the database corresponding to the hash value. The decoder 220 can retrieve or identify at least an entry identifier, a user identifier (e.g., the user who generated the worksheet), an entry fingerprint, or an entry format from the hash. These elements from the hash can be a part of the entry context.

The decoder 220 can compare a first user identifier extracted from the optical code to a second user identifier extracted from the hash of the optical code. For example, the decoder 220 can extract a first user identifier from the optical code, representing a user who generated the worksheet. The decoder 220 can extract a second user identifier from the hash extracted and validated from the optical code. The second user identifier may also represent a user who generated the worksheet. The decoder 220 can compare the first user identifier to the second user identifier. If the user identifiers match, the decoder 220 can determine that at least the optical code, the entry, or the entry context is valid, such that the computing device 201 can perform auto-grading features. In some cases, the first user identifier can represent a user who printed the worksheet. The decoder 220 can compare this first user identifier to a second user identifier (e.g., extracted from the fingerprint of a hash). The second user identifier can represent the user who printed the worksheet. The decoder 220 can determine that the optical code is valid based on a match between the first user identifier and the second user identifier.

In some implementations, the decoder 220 can validate between a first entry identifier and a second entry identifier. For example, the decoder 220 can extract the first entry identifier from the optical code and the second entry identifier from the hash of the optical code. The decoder 220 can compare the two entry identifiers. The decoder 220 can confirm that the optical code is valid or that the entry or the entry context is valid based on a match between the values of each entry identifier returned from the database. The decoder 220 can compare other elements for validation, such as other values or elements encoded in the optical code and in the hash of the optical code.

In some cases, the decoder 220 can determine that the user identifiers (or the entry identifiers) do not match based on a comparison. A mismatch between any of the comparisons by the decoder 220 can indicate a validation failure. Responsive to any validation failure (e.g., across at least one of the decoding processes), the computing device 201 can transmit or notify the client device 203 of the error in processing or auto-grading the submitted or uploaded document. For example, the computing device 201 can transmit a notification having an error code (e.g., a step of the decoding process with validation failure), a message notifying the error, an indication to re-upload the document, among others. The computing device 201 can provide the notification via a user interface of a client application used to upload the document, for example. In some cases, the computing device 201 can transmit a push notification directly to the client device 203 (e.g., given permission by the user of the client device 203).

In some implementations, the decoder 220 can revert to the perspective corrector 212 to further enhance the optical code presented in the document. For example, the optical code may not be clear due to warping, marking (e.g., physical marking on the paper or the lens of the camera), or resolution of the image. The decoder 220 can re-forward the processed document to the perspective corrector 212 to further warp correct, filter marking, enhance resolution, or improve the quality of the image (e.g., or at least the portion of the document with the optical code). After correction by the perspective corrector 212, the decoder 220 can revalidate the optical code, the entry, or the entry context. In this case, if the decoder 220 continues to fail the validation, the computing device 201 can transmit an error message or code to the client device 203. The computing device 201 can allow the client device 203 to re-capture the image or re-upload the document. In some implementations, if the client device 203 uploads the same image (e.g., same timestamps, image file size, or identification of the image), the computing device 201 may reject the upload or notify the user of the same validation failure.

In some cases, the decoder 220 may not detect any optical code on a page. For example, the decoder 220 can receive a document without an optical code rendered or printed on the document. Accordingly, the decoder 220 can skip at least the page of the document or the entry without an associated optical code. In some cases, if the optical code is not readable, the decoder 220 can skip attempting to decode the unreadable optical code. In some cases, based on errors or issues with the optical code, the computing device 201 can transmit a notification to the client device 203 regarding the errors and potential resolution to the error (e.g., re-upload document, remove markings on the optical code, re-print the worksheet with at least one optical code, among others).

The decoder 220 can proceed to extract an entry format from the hash after all validation is successful (e.g., matched user identifiers or entry identifiers). Based on the type of entry (e.g., MCQ or open-ended question) corresponding to the optical code, the entry format can include different information. For example, the decoder 220 can extract an entry format from an optical code of MCQ. In these cases, the entry format can include at least MCQ randomization data (sometimes referred to as entry randomization data) and MCQ randomization key (sometimes referred to as entry randomization key). The entry randomization data can indicate pixel locations corresponding to the multiple choices (e.g., bubbles, squares, letters, or other indicators representing each multiple choice) rendered in the image of the document. In some cases, the entry randomization data can indicate the coordinates surrounding the choices, sometimes referred to as an entry field where the computing device 201 can analyze the answer provided by the user of the client device 203. The entry randomization key can indicate an answer (or multiple answers) based on the context of each choice (e.g., text, number, or description of the choice) or the location of the multiple choices (e.g., pixel locations or position of the document) corresponding to the answer.

The decoder 220 can extract one or more choices from the image at the pixel locations corresponding to the entry randomization data. Based on the entry randomization data, the computing device 201 can determine at least one marking (e.g., created by the user physically on the document) corresponding to at least one of the multiple choices. For example, the marking can surround or be within the pixel locations. The marking can represent a selection of a choice by the user. The marking can include at least one of a circle, a shade, a box, an oval, a highlight, a checkmark, among others. In some implementations, one or more markings may not represent a selection of a choice by the user, such as a strike, a cross shape, or a strikethrough. Further, based on the entry randomization key, the computing device 201 can compare the marking of at least one of the multiple choices to the entry randomization key indicating the pixel locations of at least one choice (e.g., representing the correct answer). If the marked choice corresponds to the entry randomization key, the computing device 201 can determine that the answer provided by the user is correct. Accordingly, the computing device 201 can provide a grade for the answered entry. Providing the grade can refer to increasing a counter in a memory corresponding to the assignment accessed by the user account (e.g., different counters can be assigned to different assignments for each user account).

In further example, the decoder 220 can extract an entry format for an entry having an open-ended type. The entry format can include at least a style, height, and width of the entry field (sometimes referred to as a free-form text area or answer portion of the document). The style can indicate or represent the rendering of the entry field (e.g., a box, an underline, or an empty space for the user to provide an answer). The height and width can indicate, for example, the size of the box, the length of the underline, or the size of the empty space provided in the document. Based on the entry format, the computing device 201 can extract elements (e.g., writings or drawings) within the entry field as part of the user answer. In some implementations, the computing device 201 may discard or not account for writings or drawings outside the entry field as part of the answer. In some implementations, the computing device 201 can extract a portion of the text or image stretching outside the boundaries of the entry field, for example, to complete a sentence or an image/drawing provided by the user as part of their answer. The computing device 201 can perform features and functionalities of an assisted grading workflow (e.g., NLP, machine learning techniques, among other codes) for grading a document based on written answers. The computing device 201 can attach the extracted entry field to the assisted grading workflow for the particular assignment, student, or entry, for example.

The computing device 201 can compare the extracted and processed answers provided by the user within the entry field to an expected answer. For example, the computing device 201 can trace the steps or logic behind the user's answer to determine whether all the steps are correct, which part of the logic is incorrect, among others. The computing device 201 can provide feedback to the student or notes to the educator indicating an error or a potential error in the logic behind the answer. In some implementations, the computing device 201 can proceed directly to compare an area with the final answer by the user to a correct answer indicated by the entry context (e.g., extracted from the entry format). The final answer may be labeled by the user (e.g., via a circle or a marking) or can be a part of the entry field. In this case, the computing device 201 can compare this final answer to an entry key (sometimes referred to as an answer key).

In some implementations, the final answer may not be marked. The computing device 201 can analyze all the writing at least within the entry field to determine user logic. Based on the logic, the computing device 201 can determine the location or the portion of the document where the user logic is concluded, such as at the bottom of the entry field, bottom left of the writing, etc. In some implementations, the computing device 201 can determine that the writing in the entry field does not include an answer. Rather and for example, the computing device 201 can analyze or follow the detailed logic provided by the user in an attempt to solve the entry. The computing device 201 may not identify a conclusive phrase, value, or text based on the logic of the user-provided within the entry field. Hence, the computing device 201 can determine that the answer is not provided (e.g., none of the provided text matches the correct answer). In some implementations, the computing device 201 can determine that the answer provided by the user is within the range of the correct answer. For example, if the answer is a value of 100.596 and the answer within the entry field is 100.59 or 100.60, the computing device 201 can mark the answer of the student as correct. The answer range can be modified or configured by at least one of the educators or the administrator of the institution, for example. In some cases, the computing device 201 can be configured such that only exact answers are marked as correct. In some implementations, the computing device 201 can notify the educator of borderline cases, such as illegible writings, if the entry field having correct logic is presented without an answer, if the response from the user is slightly outside the range of the correct answer (e.g., 0.1, 0.01, or 0.001 value off, etc.), among other cases that each educator may handle differently based on grading preference. In some cases, the computing device 201 can take into account the educator's grading preference. Thus, the computing device 201 utilizing the components discussed above can perform features and functionalities to auto-grade worksheets scanned or uploaded using a camera of the client device 203.

In some implementations, the computing device 201 can include a machine learning manager (e.g., machine learning engine or model trainer). For example, the computing device 201 can train a machine learning model with historical users' handwritings or answering styles (e.g., circle for selecting a choice and cross for removing the choice from consideration). The computing device 201 can provide historical data (e.g., previously completed documents) of users as the input into a machine learning engine to train a machine learning model. The computing device 201 can store the machine learning model into the data repository 224, which can be retrieved to process and output a grade for the user based on the assignment. The machine learning model can perform various machine learning techniques, such as NLP or behavioral analysis to determine what is considered an answer (or what is not an answer) within the document, whether a part of the writing is an answer or a note for an educator, or whether the writing outside an entry field is a part of the answer or a note for self/educator. The computing device 201 can update the machine learning model based on newly collected data (e.g., newly completed documents or training data set from an administrator device 204 or the educator device).

Figure 3:
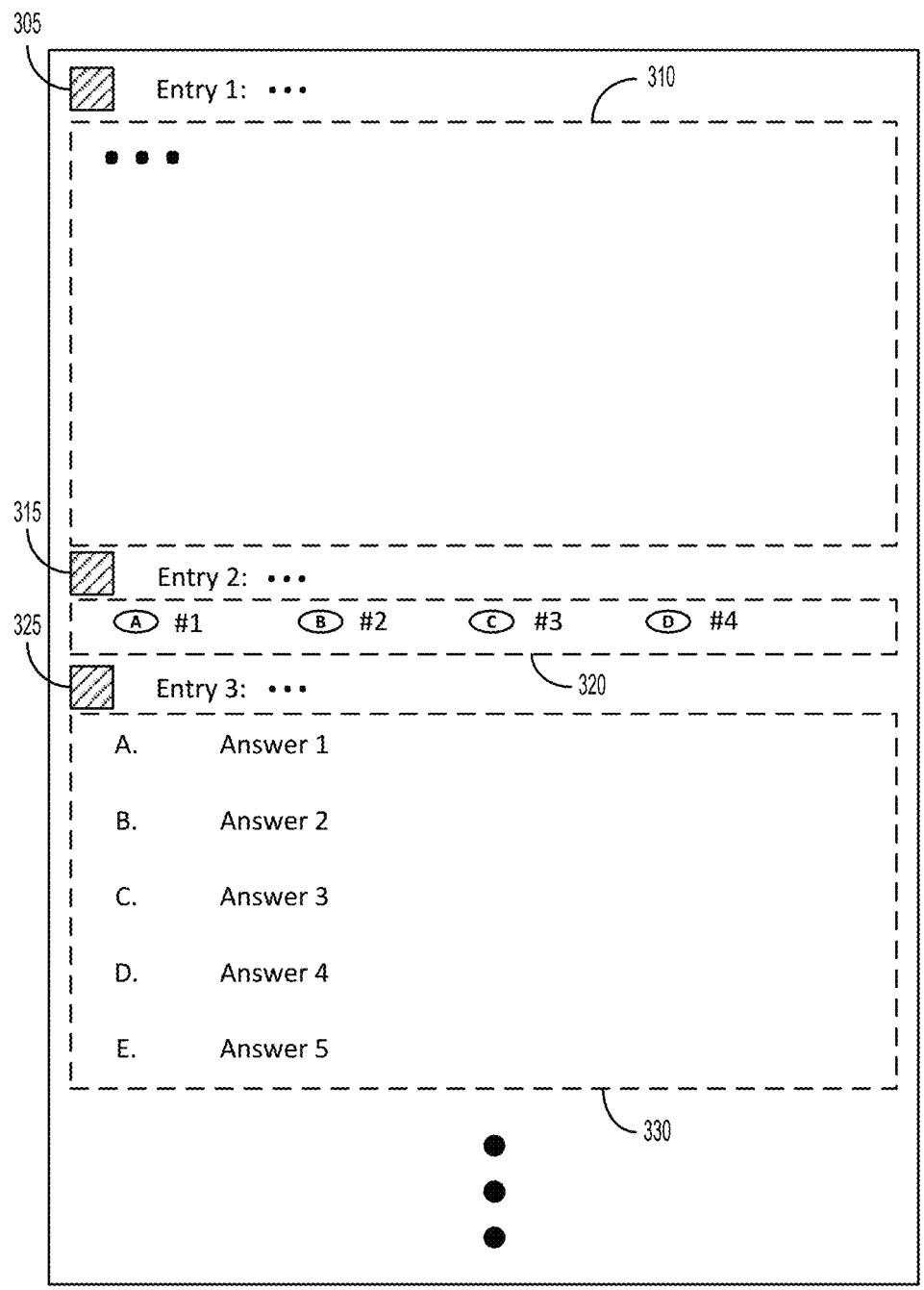
FIG. 3 is an example illustration of a worksheet with optical codes, in accordance with one or more implementations.

FIG. 3 shows an example illustration of a worksheet with optical codes, in accordance with one or more implementations. The example operations presented in illustration 300 can be executed, performed, or otherwise carried out by one or more components of the system 200 (e.g., computing device 201, network 202, client device 203, administrator device 204, or server 206), the computer system 100 described herein in conjunction with FIGS. 1A-1D, or any other computing devices described herein. The illustration 300 can include a worksheet (sometimes referred to as a document, a paper, an assignment, or a template) that can be assigned to the client device (e.g., client device 203). For example, the client device can print the worksheet having one or more elements, features, styles, or format presented in the illustration 300. The client device can upload the worksheet answered by a user (e.g., a student) to a computing device (e.g., computing device 201) or the server for processing or auto-grading. The worksheet can include at least one or more entries (e.g., questions or inquiries), one or more optical codes (e.g., optical code 305, 315, or 325), and one or more entry fields (e.g., entry field 310, 320, or 330).

Each entry can be generated by an educator or an administrator assigning the worksheet to the user. Each entry can include at least one of an entry number, an entry text, and/or an entry image. In this case, the entry can be positioned at the top of each corresponding entry field. For example, a first entry can be on top of the entry field 310, a second entry can be on top of the entry field 320, and a third entry can be on top of the entry field 330. For each entry, the computing device can generate a corresponding optical code. The computing device can extract the entry context corresponding to the entry from the optical code. For example, the optical code 305 can correspond to and include the entry context of the first entry, the optical code 315 can correspond to and include the entry context of the second entry, and the optical code 325 can correspond to and include the entry context of the third entry. The example optical codes (e.g., optical code 305, 315, or 325) in illustration 300 can be a QR code or other types of barcodes.

The size for each entry field may differ between each entry based on the entry format, entry type, or the layout of the predetermined choices (e.g., for MCQ). For example, the size of entry field 310 can differ from entry field 320 and entry field 330. In some cases, with similar types of questions, the entry fields may be the same size (e.g., MCQ with the same number of choices or open-ended questions). In this example illustration 300, the first entry can be an open-ended question, the second entry can be MCQ, and the third entry can be MCQ. The format difference (e.g., size of the fields) between entry field 320 and entry field 330 can be based on the length of the text corresponding to each choice, for example. The format or style of each entry or entry field can be configured by the educator generating the worksheet.

The computing device can extract different entry fields (e.g., entry field 310, 320, or 330) based on a corresponding optical code being extracted. For example, the computing device can extract optical code 305 having an entry format indicating the coordinates of the entry field 310. The computing device can extract optical code 316 indicating coordinates of the entry field 320 (e.g., or pixel locations of the bubble labeled "A," "B," "C," or "D"). Similarly, the computing device can extract optical code 316 indicating coordinates of the entry field 330 (e.g., or the pixel locations of the letters "A," "B," "C," "D," or "E"). The computing device can extract all writings within each entry field when extracting their corresponding optical code. In some implementations, the computing device can extract writings outside entry fields. In some implementations, the computing device can discard writings outside entry fields. The worksheet can include other entry types, entry formats, size of entry fields, predetermined answers, among other text or images to complete a worksheet, such as generated by an educator. The text "#1," "#2," "#3," "#4," "Answer 1," "Answer 2," "Answer 3," "Answer 4," and "Answer 5," provided in illustration 300 can be a placeholder, example text, or example predetermined choice configurable by the educator. These placeholders may not represent what the educator will provide to the student, rather as an example illustration for potential position/location or other format presentable in the worksheet. By providing the worksheet to the computing device, the worksheet answered by the student can be automatically graded.

Figure 4:
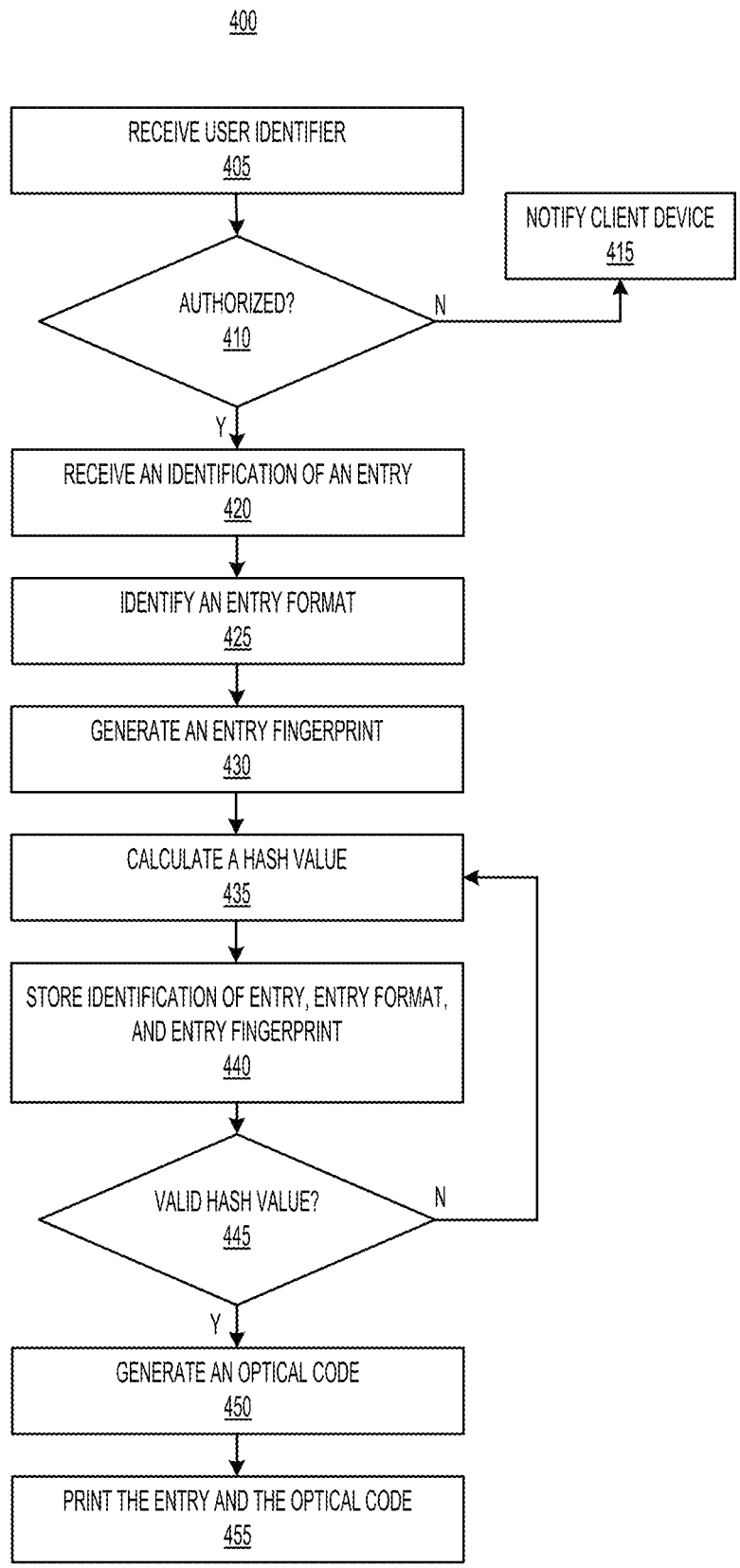
FIG. 4 illustrates an example flow diagram of a method for encoding a machine-readable document, in accordance with one or more implementations.

FIG. 4 illustrates an example flow diagram of a method for encoding a machine-readable document, in accordance with one or more implementations. The method 400 can be executed, performed, or otherwise carried out by one or more components of the system 200 (e.g., computing device 201, network 202, client device 203, administrator device 204, or server 206), the computer system 100 described herein in conjunction with FIGS. 1A-1D, or any other computing devices described herein. In a brief overview of method 400, a computing device can receive a user identifier at step 405. At step 410, the computing device can determine whether the user is authorized. At step 415, the computing device can notify a client device of the user. At step 420, the computing device can receive an identification of an entry. At step 425, the computing device can identify an entry format. At step 430, the computing device can generate a fingerprint. At step 435, the computing device can calculate a hash value. At step 440, the computing device can store the identification of the entry, entry format, and entry fingerprint. At step 445, the computing device can determine whether the hash value is valid. At step 450, the computing device can generate an optical code. At step 455, the computing device can print the entry and the optical code.

Still referring to FIG. 4 in further detail, at step 405, the computing device can receive a user identifier or an identification of a user from a client device. The computing device can receive the user identification in response to (or after) receiving a request to print a worksheet (sometimes referred to as a document, sheet, paper, or assignment). In some cases, the computing device can receive the user identifier in response to receiving a request to access the worksheet. For example, the user of a client device can access a client application and log into a user account. The user can navigate through the client application to identify an assignment that the user should attend to or complete. The user can select the assignment to print the worksheet which can include one or more entries with areas for user responses. The computing device can store the received user identifier of the user who is attempting to print the worksheet. The computing device can proceed to step 410 after receiving the user identifier.

At step 410, the computing device can determine whether the user is authorized to access or print the worksheet. For example, the computing device can compare the user identifier received from the client device (e.g., a first user identifier) to one or more user identifiers of an authorization list stored in a database (e.g., data repository). The authorization list can be referred to as a pool of verified users or a list of identification with permission to access the worksheet, file, or folder. If the user identifier received from the client device matches at least one user identifier (e.g., a second user identifier) stored in the authorization list, the computing device can provide access to the client device. The access can allow the client device to access a folder containing the worksheet, preview the worksheet digitally, download, or print the worksheet. The computing device can prepare to print the worksheet with entry context in response to a printing request from the client device, for example, first by proceeding to step 420. If the first user identifier does not match the second user identifier, the computing device can proceed to step 415, for example.

At step 415, the computing device can notify the client device or provide a notification to the client device. The computing device can provide the notification in response to determining that the user (e.g., user account or client device) is not authorized to access, download, or print the worksheet. The notification can indicate an error in obtaining access (e.g., description of the error or error code), a message to re-attempt access, a pop-up box requesting additional credentials from the user or reconfirmation of user's identity (e.g., username, password, passcode, etc.), or a termination dialog (e.g., indicating access denied or terminating request). Accordingly, after notifying the client device, the computing device can terminate the access request or wait for the user to provide credentials or information, such as revert to step 405.

At step 420, the computing device can receive an identification of an entry. The identification of the entry can be referred to as an entry identifier. The entry identifier can be used for multiple documents or worksheets if the same entry is rendered in the other worksheets. The entry identifier can be generated in response to a generation or creation of the corresponding entry. For example, an educator or an administrator can provide an entry to the computing device for rendering or printing in a worksheet. Responsive to receiving the entry, the computing device can generate an entry identifier and associate the entry identifier with the received entry. The entry identifier can be a value associated with an address in the database, such that the computing device can store or retrieve the entry identifier at the address in the database corresponding to the value. The computing device can store and link the entry identifier with other information related to the entry.

The computing device can receive a user identifier, such as with the entry identifier. In some cases, the user identifier can refer to an identification of a user who generated the entry or the worksheet (e.g., which can be the same user). The computing device can store the user identifier in the database. For example, responsive to receiving an entry generated or created by a user, the computing device can receive or retrieve a user identifier of the user who uploaded or assigned the entry to the worksheet. In some cases, the user identifier can refer to a user requesting printing of the machine-readable document. For example, the computing device can receive both the request to print the worksheet and the user identifier who transmitted the request.

At step 425, the computing device can identify an entry format from the identification of the entry. For example, the computing device can access the database using the entry identifier as an access key (e.g., the entry identifier can indicate an address within the database storing information related to the entry). From the database, the computing device can retrieve the entry format associated with the entry identifier. The entry format can include at least an entry type, a randomization seed value, or can be used to identify coordinates of an entry field. The entry type can refer to the type of entry (or question), such as multiple-choice or open-ended. The randomization seed value can be, be similar to, or include at least one of MCQ randomization hash (sometimes generally referred to as randomization hash) or MCQ randomization key (sometimes generally referred to as randomization key). The computing device can use the randomization hash to determine pixel locations or coordinates of choices for MCQ (e.g., bubbles, squares, letters, among other labels for the choices). The computing device can use the randomization key to determine the correct answer associated with each of the choices for MCQ. The coordinates of an entry field (sometimes referred to as entry coordinates) can indicate the area, portion, size, or locations within the document where the user can provide a response to the entry. The computing device can use the entry coordinates to determine the location or portion of the worksheet to extract the response associated with the entry.

At step 430, the computing device can generate an entry fingerprint. The entry fingerprint can include a hash or a combination of printing information, such as a printing timestamp for the entry (e.g., when the entry, the page, or the worksheet is being printed), a user identifier (e.g., the user who is printing the worksheet), and a device identifier (e.g., identifier of the printing device). In some cases, generating the fingerprint can refer to the computing device calculating a hash of the combination of printing information (e.g., the printing timestamp for the entry, the user identifier, and the device identifier). The computing device can store the fingerprint using the calculated hash as the key. For example, the hash can include a value corresponding to an address in the database. The computing device can use the hash to access the address in the database and store the fingerprint at the address.

At step 435, the computing device can calculate a hash value from a hash of at least the identification of the entry, the entry format, and the entry fingerprint. For example, the computing device can combine the entry identifier, the entry format, and the entry fingerprint into the hash. The computing device can combine the user identifier of the user who generated the worksheet into the hash. Using the hash, the computing device can calculate a hash value corresponding to an address in the database. The computing device can digitally sign the hash using a secret key, such as to secure information from the hash to be retrieved by other devices. In some implementations, signing the hash can refer to the computing device signing the hash d at the address in the database corresponding to the hash value. In this case, to decode the hash, the computing device can access the hash using the hash value and sign the hash using a secret key (e.g., which can be the same secret key as will be encoded into the document or a different key stored in the database). In some implementations, signing the hash can refer to the computing device signing the hash value using the secret key. In this case, to decode or retrieve elements from the hash, the computing device can sign the hash value using a secret key and access the hash using the signed hash value, thereby using the hash as a key to access at least one of the entry identifier, the user identifier, fingerprint, or entry format.

At step 440, the computing device can store the identification of the entry, the entry format, and the entry fingerprint in a database at an address corresponding to the hash value. The computing device can also store the user identifier of the user who generated the worksheet (e.g., educator identifier) into the database. For example, the computing device can use the hash value as a key to store and access the elements of the hash. The elements of the hash can include, but are not limited to, the entry identifier, the user identifier, the fingerprint, and the entry format. After storing the hash (or the elements of the hash), the computing device can proceed to step 445.

At step 445, the computing device can determine whether the hash value is valid. For example, the computing device can perform a check by using the hash value to access the hash (or signing the hash value with the secret key). If the computing device can access the hash using the hash value, the computing device can determine that the hash value is valid. The computing device can proceed to step 450 responsive to determining that the hash value is valid. Otherwise, the computing device can diagnose the hash value, which may be corrupted during the generation process. For example, if the hash value is not valid, the computing device can generate or calculate a second hash value to store the hash or elements of the hash (e.g., revert to step 435). In some cases, the computing device can allocate a space at an address corresponding to the hash value to store the hash. In some cases, the computing device can compare the generated hash value with a list of hash values stored in the database. If the generated hash value does not match any values in the list, the computing device can determine that the hash value is valid, as it is unique from other values. Otherwise, the computing device can either generate a new hash value or remove the old hash value and allocate a space at the address to populate the database with the hash.

At step 450, the computing device can generate an optical code from the hash value. The optical code can be at least one of a QR code, an Aztec code, data matrix, among other barcodes. For example, the computing device can use the hash value to generate an optical code. Generating the optical code using the hash value can be similar to using elements of the hash (e.g., entry identifier, generate user identifier (e.g., the user who generated the worksheet or entry), fingerprint, or entry format) to generate the optical code. The computing device can include at least an entry identifier, a user identifier (e.g., either the user who generated or printed the worksheet), or a secret key to generate the optical code. Hence, by generating the optical code using the above, the optical code can include information at least the entry identifier, the user identifier, the hash, and the secret key used to sign the hash, for example. The computing device can proceed to step 455 after generating the optical code.

At step 455, the computing device can print the entry and the optical code on the machine-readable document. For example, after generating the optical code, the computing device can determine an area or a portion on the document to print the entry. If there is no prior entry or if this is the first entry on the page, the computing device can print the entry and the optical code at the top of the page (e.g., leaving room for the header or other page layout). If the entry is not the first entry on the page (e.g., a second entry, a third entry, etc.), the computing device can determine to print the optical code and the entry after the previous entry and the previous entry field (e.g., area below the previous entry for collecting user responses). The optical code can be printed in proximity to the entry, such as to the left or the right of the entry, among other locations near the entry. Printing the entry and the optical code at this stage can refer to the computing device rendering the optical code and the entry on a digital worksheet, such as for preview by the user. The computing device can provide a gap or space between the current entry and the next entry for collecting responses from the user. The size of the space between the entries can be based on the entry format (e.g., coordinates of the entry field, position of the choices for the MCQ, etc.).

Figure 5:
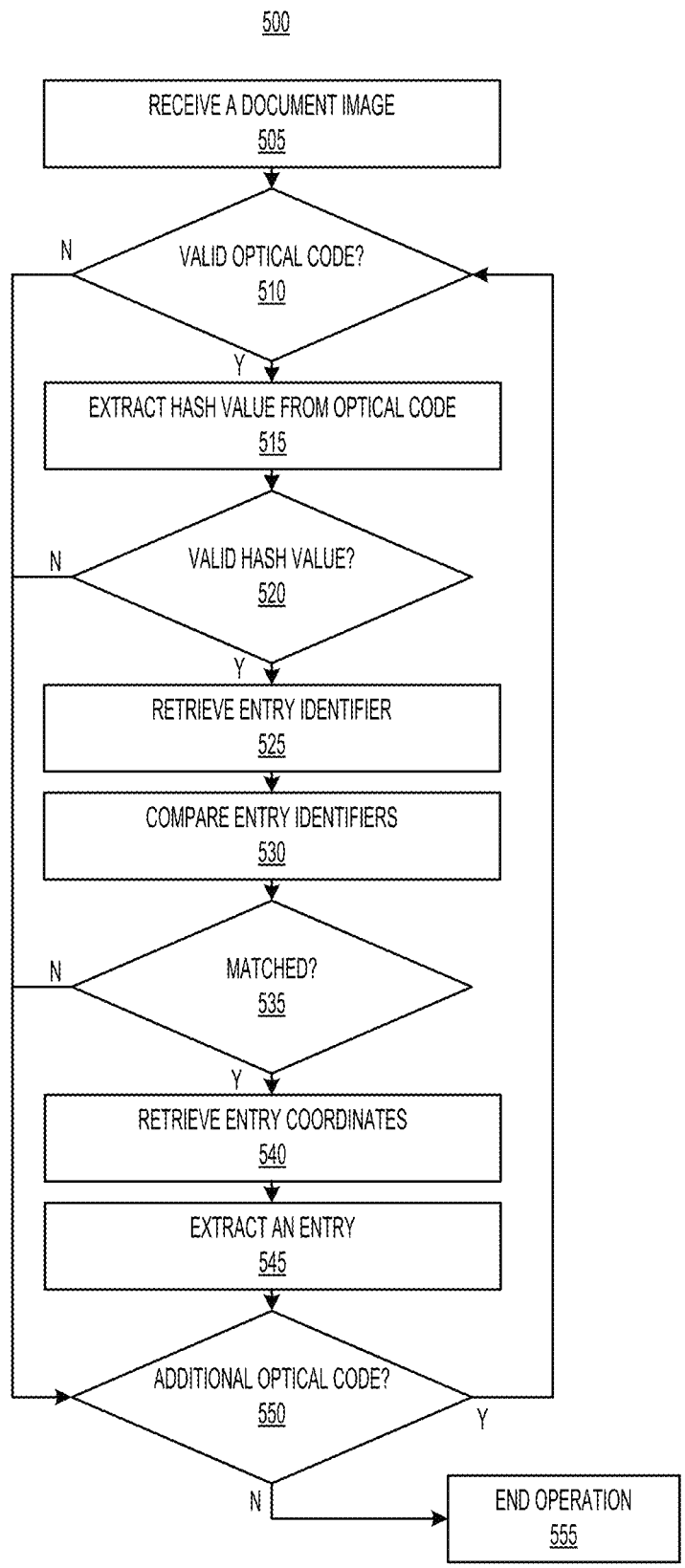
FIG. 5 illustrates an example flow diagram of a method for decoding a machine-readable document, in accordance with one or more implementations.

FIG. 5 illustrates an example flow diagram of a method for decoding a machine-readable document, in accordance with one or more implementations. The method 500 can be executed, performed, or otherwise carried out by one or more components of the system 200 (e.g., computing device 201, network 202, client device 203, administrator device 204, or server 206), the computer system 100 described herein in conjunction with FIGS. 1A-1D, or any other computing devices described herein. In a brief overview of method 500, a computing device can receive a document image at step 505. At step 510, the computing device can determine whether an optical code is valid. At step 515, the computing device can extract hash value from the optical code. At step 520, the computing device can determine whether the hash value is valid. At step 525, the computing device can retrieve an entry identifier. At step 530, the computing device can compare entry identifiers. At step 535, the computing device can determine whether the entry identifiers matched. At step 540, the computing device can retrieve entry coordinates. At step 545, the computing device can extract an entry. At step 550, the computing device can determine whether there is an additional optical code. At step 555, the computing device can end the operation (e.g., end the decoding operation).

Still referring to FIG. 5 in further detail, at step 505, the computing device can receive an image of the machine-readable document. The computing device can perform perspective correction prior to decoding the document. For example, the computing device can receive raw image data of the document with other artifacts, warping, or areas around the image. The computing device can crop, rotate, translate, or warp to correct the image. The computing device can perform other pre-processing techniques, such as enhancing the resolution of the image or filtering areas around or a portion of the border of the document. The computing device may not remove or filter portions of the document, such as writings within the document. The image of the document can include at least one entry and a corresponding at least one optical code encoding a hash value, an entry identifier (e.g., identification of the entry), and a user identifier. The encoded elements (e.g., hash value, an entry identifier, or the user identifier) of the optical code can be, or be a part of, the entry context corresponding to the entry. The entry identifier extracted directly from the optical code can be referred to as a first entry identifier. The computing device can identify one or more optical codes presented within the document. In some cases, if the worksheet includes an entry without a corresponding optical code, the computing device may revert to an encoder to determine whether the entry is valid (e.g., based on NLP and comparing the entry to a list of entries stored in the database for the worksheet), whether to generate an optical code for the entry, or determine the entry context for the entry.

At step 510, the computing device can determine whether an optical code is valid. For example, the computing device can attempt to extract information from the optical code. The extraction process can be referred to as digitally scanning the optical code. If the computing device determines that the optical code is not readable (e.g., due to obstruction on the area of the optical code or blurred optical code), does not include information related to the entry, or includes information of a different entry from the corresponding rendered entry, the computing device can determine that the optical code is not valid. Accordingly, the computing device can proceed to step 550 to identify any additional optical code rendered in the image. If the computing device can extract and retrieve data from the optical code, such as accessing an address in the database containing the entry identifier, the computing device can determine that the optical code is valid. Therefore, the computing device can proceed to step 515. The computing device can repeat the optical code verification process for all optical codes presented or rendered in each image.

At step 515, the computing device can extract a hash value from a corresponding optical code. The corresponding optical code can refer to the current optical code linked to an entry being extracted. The computing device can extract the hash value responsive to validating the optical code. The computing device can extract or retrieve a hash from an address of the database corresponding to the hash value. In some implementations, the hash value can represent the address in the database. The computing device can extract or retrieve other information or elements from the optical code, such as the first user identifier, an entry identifier (e.g., a first entry identifier), or a secret key encoded in the optical code. The computing device can extract the first user identifier and the first entry identifier directly from the optical code (e.g., not within the hash accessed using the hash value). To extract or retrieve the hash, the computing device can sign the hash value or the hash using a secret key. The secret key can be similar to or different from the key encoded into the optical code. The secret key used for decoding can be stored in the database, which may be different from the secret key extracted from the optical code, for example. Depending on whether the encoder sign the hash value or the hash using an encoder secret key, the computing device can use a decoder secret key (e.g., which may or may not be the same as the encoder secret key) on either the signed hash value or the signed hash to extract information from the address of the database.

At step 520, the computing device can determine whether the hash value is valid. For example, the computing device can sign the hash value using a secret key. If the computing device cannot extract the hash value using the secret key (e.g., or unlock the hash value), the computing device can notify the administrator, the educator, and/or the client device. For example, the computing device can provide a notification with an error message, an error code, or the optical code where the hash value was signed with an invalid secret key or the decoder secret key is not a pair of the encoder secret key. In some implementations, if the computing device identifies that the address corresponding to the hash value does not include a hash, is not a valid address, or contain other information that is not the hash of the entry, the computing device can determine that the hash value is invalid and proceed to step 550 to extract other optical code. If the computing device can sign the hash value and access the hash at an address corresponding to the hash value, the computing device can determine that the hash value is valid. Accordingly, the computing device can proceed to step 525.

At step 525, the computing device can retrieve a second entry identifier from a database at an address corresponding to the hash value. The second entry identifier can refer to an entry identifier extracted from the hash. The computing device can retrieve other hashed elements or information from the database at the address corresponding to the hash value, such as a second user identifier or a fingerprint (e.g., print fingerprint).

At step 530, the computing device can compare the first entry identifier to the second entry identifier. The first entry identifier can refer to an entry identifier extracted from the optical code. The second entry identifier can refer to an entry identifier included in the hash. The first entry identifier can be the same as the second entry identifier. In some cases, the first entry identifier may not be the same as the second entry identifier. In some implementations, the computing device can compare a first user identifier to a second user identifier. The first user identifier can refer to the identification of the user who generated the worksheet or the user who printed the worksheet. The second user identifier can refer to a second user who generated the worksheet or a second user who printed the worksheet (e.g., hashed in the print fingerprint). The first user identifier can be the same as the second user identifier. In some cases, the first user identifier may be different from the second user identifier.

At step 535, the computing device can determine whether the first entry identifier matches the second entry identifier. The computing device can determine that the entry identifiers matched based on a comparison between the values of the first entry identifier and the second entry identifier. In some cases, the computing device can determine that the entry identifiers do not match. The computing device can compare a first user identifier to a second user identifier (e.g., either the print user identifier or the generated user identifier). The computing device can determine that the user identifiers match or do not match. The computing device can compare other identifiers or elements extracted directly from the optical code to the elements in the hash accessed via the hash value (e.g., used as a key).

If all of the above pairs matched, the computing device can proceed to step 540. If any of the comparisons above do not match, the computing device can proceed to step 550 to identify additional optical code in the document. With any validation failure or error, the computing device can notify at least one of the client devices or the administrator device accordingly. By notifying the client device, the computing device can request a second image of the worksheet (or a page of the worksheet with validation error), such that at least one of the optical codes can be re-validated.

At step 540, the computing device can retrieve entry coordinates from the database at the address corresponding to the hash value. The computing device can retrieve the entry coordinates responsive to or after determining that the entry identifiers (e.g., or other identifiers) matched for validation purposes. The computing device can use the entry coordinates to identify the boundaries of a user-entry region (sometimes referred to as an entry field). The computing device can retrieve or extract other information that can be used to identify entries (e.g., in this case, answers or writings provided by the user) to extract from the worksheet. The entry coordinates can be a part of the entry format hashed with the entry identifier, the user identifier, and the fingerprint. The entry coordinates can indicate the size (e.g., height and width) of a portion of the page to be extracted from the worksheet as part of the answer. The computing device can retrieve other entry formats, such as randomization seed value (e.g., randomization data or randomization key) or coordinates of various user-fillable elements (e.g., bubble, box, or labels representing the choices for MCQ). The computing device can use the coordinates of various user-fillable elements to identify pixel locations corresponding to the user-fillable elements. In some cases, the computing device can use the coordinates of the various user-fillable elements to identify the boundaries around the user-fillable elements for extracting the user entries (e.g., answers or writings provided by the user).

At step 545, the computing device can extract an entry (e.g., user-filled entry or sometimes generally referred to as user entry) from the image at the entry coordinates. At least some of the entries discussed in this step can refer to as the responses, notes, or answers provided by the user. The questions can be referred to as inquiries associated with the optical code. For example, responsive to identifying the boundaries or entry field corresponding to the inquiry, the computing device can extract content, elements, writings, or notes provided within the entry field for further analysis. The computing device can use the entry provided by the user as a response or an answer to the inquiry for automatically grading the worksheet. The computing device can repeat this process for other inquiries to automatically grade the worksheet.

After extracting the entry, the computing device can process the entry to determine whether an answer is provided in the entry field. For example, if the entry field is blank or not filled, the computing device may not provide points to this inquiry, as no answer is provided. If the score associated with the assignment starts at 100, for example, the computing device can deduct at least a portion of the points based on the score assigned to the inquiry (e.g., 5 points in a worksheet of 20 inquiries, 10 points in a worksheet of 10 inquiries, among other scales). In some cases, the computing device can determine an area (e.g., within an entry field of an open-ended entry) that represents an answer. For example, the user can provide a final response (or final answer after the logic explanation) to the inquiry at the end or bottom of the writings, or provide a marking indicating the answer, such as underline(s), box, or circle around the answer.

The computing device can determine whether the user-filled entries or writing is eligible. For example, the computing device may identify that multiple user-fillable elements are filled at the same level of darkness, thickness (e.g., of the writing utensil), or clarity. If the computing device determines that, based on the randomization key, the correct answer is only one of the various user-fillable elements, the computing device can automatically mark the answer as incorrect (e.g., providing a score of zero for the inquiry or deducting the score from the inquiry). In some cases, the computing device can determine that the handwriting is illegible. The computing device may or may not notify the client device to re-write, resubmit a response to the inquiry, or type/mark the intended response via the client application. The computing device can notify an educator that generated or assigned the worksheet of any borderline cases, such as multiple answers provided, unreadable handwriting, among others for the educator to take appropriate action.

The computing device can determine whether the answer is correct or incorrect. For example, based on an MCQ entry type, the computing device can compare pixel locations of the user-fillable elements (or labels) marked by the user to a randomization key. The randomization key can include pixel locations of the correct answer. If the randomization key of the inquiry matches the marked user-fillable element(s), the computing device can determine that the user provided the correct answer. Otherwise, the computing device can determine that the user provided an incorrect answer. The computing device can provide or deduct the score to or from the assignment of the user account accordingly. For an open-ended entry type, the computing device can perform optical character recognition on the image of the document within the identified boundaries. Using optical character recognition, the computing device can extract letters, numbers, among other texts from the image of the document. The computing device can perform NLP to determine the context of the user entries (e.g., logic to derive at the answer) or a final answer written by the user (or student who uploaded the worksheet). The computing device can compare the context of the user entries and/or the final answer to an answer key (e.g., including a list of entry identifiers and their corresponding correct answer pair). If similar or matched, the computing device can grade the user entry as correct. If not similar or not matched, the computing device can grade the user entry as incorrect.

In some implementations, the computing device can provide a portion of the score based on the context (or details) of the logic or written description to derive the answer. For example, if at least one of multiple logics used to derive a final answer is incorrect (e.g., with one miscalculation from 10 equations), based on settings and configurations from the educator device or the administrator device, the computing device can provide at least a portion of the score to the user (e.g., 5 out of 10 points or 9 out of 10 points). In some cases, based on the settings and configurations, the computing device can mark the whole user entries as incorrect based on at least one incorrect logic, calculation, detail, or procedure detailed in the user entry.

In some implementations, the computing device can transmit the extracted entries to an analytic server to analyze and process the contents of the entries. For example, the server can perform NLP to the entries or image recognition to determine the context or details of the user-provided entries. The computing device can receive feedback or processed data from the server. Using the processed data, the computing device can provide a grade (or score) to at least the inquiry. In some cases, the computing device can deduct at least a portion of the score from the corresponding inquiry. After extracting the user entry and/or automatically grading the user entry, the computing device can proceed to step 550.

At step 550, the computing device can identify any additional optical code within the page of the worksheet. The computing device can identify additional optical codes from other pages of the worksheet. For example, if the current optical code is the last optical code for extraction, the computing device can proceed to step 555. If the computing device identifies additional optical code(s), the computing device can revert to step 510 to determine whether the optical code is valid. This process can be looped to extract or process optical codes to automatically grade the worksheet.

At step 555, the computing device can proceed to end, terminate, or exit the operation of grading the worksheet. The computing device can end the operation responsive to or after extracting all optical codes from or grading all entries in the worksheet. The end operation can refer to procedures or processes taken by the computing device after grading the worksheet. For example, the computing device can provide a final grade or score to the client device. The computing device can notify an educator to take action, such as to review an answer or writings provided by the user. The computing device can provide one or more error messages or error codes to at least one of a client device (e.g., student device or educator device) or the administrator device. The computing device can generate a report of the grading. The computing device can transmit the report to the educator device for feedback on the performance of the student. In some implementations, the computing device can generate a status report including at least a log file of application events, scripts executed by the computing device, among other lists of events performed by the computing device or other components of the system (e.g., system 200). Accordingly, the computing device can perform the features and functionalities discussed above to encode, decode, and automatically grade the documents. Thus, the computing device can reduce resource consumption (e.g., from utilizing specialized sheets or equipment for automated grading), improve accuracy or reduce erroneous in grading answers (e.g., using incompatible input options or slight format blunder), and increase efficiency in grading worksheets by enabling remote uploads and gradings of assignment using commodity image capturing devices rather than manually using scanning machines to grade the assignments.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the educational content system 205 can include clients and servers. For example, the educational content system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML, page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the educational content system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for generating and formatting multiple teaching media, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method for encoding a machine-readable document, comprising:
   for each of one or more entries to be encoded on the machine-readable document:
      receiving, by a computing device, an identification of an entry,
      identifying, by the computing device from the identification of the entry, an entry format,
      generating, by the computing device, an entry fingerprint,
      calculating, by the computing device, a hash value from a hash of at least the identification of the entry, the entry format, and the entry fingerprint,
      storing, by the computing device in a database at an address corresponding to the hash value, the identification of the entry, the entry format, and the entry fingerprint,
      generating, by the computing device, an optical code from the hash value, and
      printing, by the computing device on the machine-readable document, the entry and the optical code.

2. The method of claim 1, wherein the optical code is printed in proximity to the entry.

3. The method of claim 1, wherein receiving the identification of the entry further comprises receiving, by the computing device, an entry identifier and a user identifier.

4. The method of claim 1, wherein generating the entry fingerprint further comprises combining a printing timestamp for the entry, a user identifier, and a device identifier.

5. The method of claim 4, wherein generating the entry fingerprint further comprises calculating a hash of the printing timestamp for the entry, the user identifier, and the device identifier.

6. The method of claim 4, wherein the user identifier is associated with a user requesting printing of the machine-readable document.

7. The method of claim 1, wherein the entry format identifies coordinates of an entry field.

8. The method of claim 1, wherein the entry format comprises a randomization seed value.

9. A method for decoding a machine-readable document, comprising:
   receiving, by a computing device, an image of the machine-readable document comprising at least one entry and a corresponding at least one optical code encoding a hash value, a first entry identifier, and a user identifier;
   for each of the at least one entry:
      extracting, by the computing device from the corresponding optical code, the hash value,
      retrieving, by the computing device from a database at an address corresponding to the hash value, a second entry identifier,
      determining, by the computing device, that the first entry identifier and the second entry identifier match,
      responsive to the determination, retrieving, by the computing device from the database at the address corresponding to the hash value, entry coordinates, and
      extracting, by the computing device from the image at the entry coordinates, an entry.

10. The method of claim 9, wherein each corresponding at least one optical code further encodes a first user identifier; and further comprising, for each of the at least one entry:
   retrieving, by the computing device from the database at the address corresponding to the hash value, a second user identifier, and
   determining, by the computing device, that the first user identifier and second user identifier match;
   and wherein retrieving the entry coordinates is performed further responsive to the determination that the first user identifier and second user identifier match.

11. The method of claim 9, wherein the entry coordinates of a first entry identify coordinates of a plurality of user-fillable elements; and
   wherein extracting the first entry comprises identifying a first filled-in user-fillable element of the plurality of user-fillable elements.

12. The method of claim 9, wherein the entry coordinates of a first entry identify boundaries of a user-entry region; and wherein extracting the first entry further comprises performing optical character recognition on the image of the machine-readable document within the identified boundaries.

13. A system for encoding a machine-readable document, comprising:
a computing device comprising a memory storing a database and a processor;
wherein the processor is configured to:
for each of one or more entries to be encoded on the machine-readable document:
receive an identification of an entry,
identify, from the identification of the entry, an entry format,
generate an entry fingerprint,
calculate a hash value from a hash of at least the identification of the entry, the entry format, and the entry fingerprint,
store, in the database at an address corresponding to the hash value, the identification of the entry, the entry format, and the entry fingerprint,
generate an optical code from the hash value, and
print, on the machine-readable document, the entry and the optical code.

14. The system of claim 13, wherein the optical code is printed in proximity to the entry.

15. The system of claim 13, wherein the processor is further configured to, for each of the one or more entries, receive an entry identifier and a user identifier.

16. The system of claim 13, wherein the processor is further configured to, for each of the one or more entries, combine a printing timestamp for the entry, a user identifier, and a device identifier to generate the entry fingerprint.

17. The system of claim 16, wherein the processor is further configured to, for each of the one or more entries, calculate a hash of the printing timestamp for the entry, the user identifier, and the device identifier.

18. The system of claim 16, wherein the user identifier is associated with a user requesting printing of the machine-readable document.

19. The system of claim 13, wherein the entry format identifies coordinates of an entry field.

20. The system of claim 13, wherein the entry format comprises a randomization seed value.

* * * * *